(12) United States Patent
Huddleston

(10) Patent No.: US 10,794,514 B2
(45) Date of Patent: Oct. 6, 2020

(54) SECURITY BLOW OUT PROOF VALVE ASSEMBLY

(71) Applicant: THE FORD METER BOX COMPANY, INC., Wabash, IN (US)

(72) Inventor: Robert Huddleston, Wabash, IN (US)

(73) Assignee: The Ford Meter Box Company, Inc., Wabash, IN (US)

( * ) Notice: Subject to any disclaimer, the term of this patent is extended or adjusted under 35 U.S.C. 154(b) by 30 days.

(21) Appl. No.: 16/182,840

(22) Filed: Nov. 7, 2018

(65) Prior Publication Data

US 2019/0145543 A1 May 16, 2019

Related U.S. Application Data

(60) Provisional application No. 62/584,148, filed on Nov. 10, 2017.

(51) Int. Cl.
| | | |
|---|---|---|
| *F16K 31/60* | (2006.01) | |
| *F16K 35/06* | (2006.01) | |
| *F16K 35/10* | (2006.01) | |
| *F16K 5/06* | (2006.01) | |

(52) U.S. Cl.
CPC .............. *F16K 31/60* (2013.01); *F16K 5/06* (2013.01); *F16K 35/06* (2013.01); *F16K 35/10* (2013.01)

(58) Field of Classification Search
CPC .......... F16K 31/60; F16K 35/10; F16K 35/06; F16K 5/06
See application file for complete search history.

(56) References Cited

U.S. PATENT DOCUMENTS

| | | | | |
|---|---|---|---|---|
| 576,956 A | * | 2/1897 | Doyle .................... | F16K 35/06 70/176 |
| 664,462 A | * | 12/1900 | Campbell ............... | F16K 35/10 70/180 |
| 932,188 A | * | 8/1909 | Strelezky .............. | F16K 31/602 251/99 |
| 983,842 A | * | 2/1911 | Schneible ............... | F16K 35/10 70/180 |
| 2,035,762 A | * | 3/1936 | Roberts .................... | F16K 5/12 251/96 |
| 4,162,690 A | * | 7/1979 | Anderson ............... | F16K 35/06 137/385 |
| 4,848,724 A | | 7/1989 | Pettinaroli | |

(Continued)

OTHER PUBLICATIONS

International Search Report; Application No. PCT/US18/59764; Titled: Security Blow Out Proof Valve Assembly; dated Jan. 16, 2019.

(Continued)

*Primary Examiner* — Umashankar Venkatesan
(74) *Attorney, Agent, or Firm* — Barnes & Thornburg LLP

(57) ABSTRACT

A security blow-out-proof valve assembly is provided that includes a valve body, valve stem, and a head. The valve body contains a valve member movable between open and closed positions within the valve body. The valve stem extends from the valve body and moves the valve member between open and closed positions within the valve body. The head located on the valve stem is selectively movable relative to the valve stem and selectively moves the valve stem. When the head selectively moves the valve stem the head moves the valve member between open and closed positions.

15 Claims, 20 Drawing Sheets

(56) References Cited

U.S. PATENT DOCUMENTS

| | | | | |
|---|---|---|---|---|
| 5,058,622 | A | * | 10/1991 | Chitty, Jr. .............. F16K 35/06 137/385 |
| 5,188,335 | A | | 2/1993 | Pettinaroli |
| 5,360,036 | A | | 11/1994 | Kieper |
| 5,365,759 | A | * | 11/1994 | Bonomi ................. F16K 35/06 137/385 |
| 6,276,662 | B1 | | 8/2001 | Bugatti |
| 6,860,177 | B2 | | 3/2005 | Bugatti |
| 2014/0319394 | A1 | | 10/2014 | Bisio et al. |

OTHER PUBLICATIONS

Notification of Decision Concerning Request for Rectification—Form 217; PCT/US2018/059764; dated Mar. 8, 2019.
Response to Invitation to Correct Defects Filed Apr. 25, 2019; PCT/US2018/059764.
Revised Formal Drawings—20 sheets of Figs.

* cited by examiner

SECURITY BLOW OUT PROOF VALVE ASSEMBLY

RELATED APPLICATIONS

The present Application is related to and claims priority to U.S. Provisional Patent Application, Ser. No. 62/584,148, filed on Nov. 10, 2017, entitled "Security Blow Out Proof Valve Assembly." The subject matter disclosed in that Provisional Application is hereby expressly incorporated into the present Application.

TECHNICAL FIELD AND SUMMARY

The present disclosure is related to valves with rotating stems or flow control devices, and particularly to lockable and blow-out-proof stem features on a ball-valve assembly. The ball-valve assembly includes a retained, selectively fixed, and actuating T-head. The T-head is not removable but may be used to actuate between a fixed open, fixed closed, actuating state, or any in between location. Alternate applications contemplated within the scope of this disclosure include gate, globe, and butterfly valves.

Ball-valve assemblies are devices that control the flow of fluid. They either allow or prevent fluid from passing through them between multiple pipes or between a pipe and some other structure such as a meter box, etc.

Typically, ball-valves include a housing that contains a ball with a bore axially disposed there through. The cavity in the housing conforms to the shape of the ball. A separate valve stem extends from the ball through the valve housing and can be rotated by a knob or lever to rotate the ball with respect to flow path. By rotating the ball in one direction, the bore aligns with the adaptors that lead to adjoining pipes to allow fluid to flow there through. Conversely, the ball may be rotated in the opposite direction, typically about 90 degrees, so the bore disposed through the ball is oriented perpendicular to the fluid flow. This creates an obstruction or blocks the path of travel for the fluid, thereby shutting down flow from one side of the valve to the other.

In some applications, the fluid pressure experienced by the ball-valve may be substantial. In this case, it may be the valve stem that is a point of structural weakness. The valve stem may fail since it is both a moving part and connects the interior of the housing with the exterior. To help ensure the valve stem does not fail, it is flanged on the interior side of the valve body between the ball itself and O-rings that seal off the valve from the exterior. The flange keeps the stem in the housing.

In some circumstances, it is necessary for the valve to be locked in either an open or closed position. Under these circumstances, a mechanism is needed that prevents the ball-valve from being open or closed except by authorized personnel. Accordingly, it would be beneficial to provide a mechanism that selectively allows the ball-valve to be locked in an open position, a closed position, or be movable between open and closed positions, under particular circumstances. It would also be beneficial to provide blow-out-proof stem features to provide the strength capabilities of the valve in addition to it being selectively lockable.

Accordingly, an illustrative embodiment of a security blow-out-proof valve assembly provides a valve assembly which comprises: a valve member having a passage disposed there through; a valve body that contains the valve member; wherein the valve body has a first side and a second side; wherein the valve member located in the valve body is selectively movable relative to the valve body; wherein movement of the valve member to a first location positions the passage of the valve member in fluid communication with both the first side and the second side of the valve body; wherein movement of the valve member to a second location positions the passage of the valve member so the passage is not in fluid communication with both the first side and the second side of the valve body; a valve stem that engages the valve member and is movable therewith; wherein the valve stem includes an at least one surface; a head located on the valve stem and is selectively movable therewith; wherein the head is movable relative to the valve stem such that the head is selectively engagable with the at least one surface of the valve stem; wherein when the head is engaged with the at least one surface of the valve stem movement of the head moves the valve stem such that the valve stem moves the valve member between the first and second locations within the valve body; wherein when the head is not engaged with the at least one surface of the valve stem, movement of the head is relative to the valve stem and the valve stem does not move the valve member; a lock that selectively engages the valve stem; wherein when the lock is engaged to the valve stem the lock limits movement of the head to the extent that the head cannot engage the at least one surface on the valve stem which prevents the head from moving the valve stem to move the valve member; wherein when the lock is not engaged to the valve stem the lock does not limit movement of the head such that the head is selectively engageable with the at least one surface on the valve stem such that movement of the head moves the valve stem such that the valve stem moves the valve member; and a detent located adjacent the head; wherein the head includes a first cavity, a second cavity, and a third cavity such that the detent is sized to be selectively received in the first cavity, the second cavity, and the third cavity; wherein when the detent is located in the first cavity, the head is held such that the valve member is positioned at the first location within the valve body; wherein when the detent is located in the second cavity, the head is held such that the valve member is positioned at the second location within the valve body; and wherein when the detent is located in the third cavity, the head is movable such that the valve member is movable between the first and second locations within the valve body.

In the above and other illustrative embodiments, the valve assembly may further comprise: the valve member being a ball valve; the head being a T-head; the head being movable linearly relative to the valve stem such that the head is selectively engagable with the at least one surface of the valve stem, and wherein when the head is engaged with the at least one surface of the valve stem movement of the head and the valve stem is rotational to move the valve member between first and second locations within the valve body; the head being moved linearly to disengage the head from the detent; is retained on the valve stem when movable relative to the valve stem; the valve stem including a recess that receives a locking ring that engages both the valve stem and the head, wherein the locking ring and the recess in the valve stem limits the movement of the head relative to the valve stem; and the valve stem including a flange that retains a portion of the valve stem on the valve body.

Another illustrative embodiment of a security blow-out-proof valve assembly provides a valve assembly which comprises: a valve member having a passage disposed there through; a valve body that contains the valve member; wherein the valve body has a first side and a second side; wherein the valve member located in the valve body is selectively movable relative to the valve body; wherein movement of the valve member to a first location positions the passage of the valve member in fluid communication with both the first side and the second side of the valve body; wherein movement of the valve member to a second location positions the passage of the valve member so the passage is not in fluid communication with both the first side and the second side of the valve body; a valve stem that engages the valve member and is movable therewith; wherein the valve stem includes an at least one surface; a head located on the valve stem and is selectively movable therewith; wherein the head is movable relative to the valve stem such that the head is selectively engagable with the at least one surface of the valve stem; and wherein when the head is engaged with the at least one surface of the valve stem movement of the head moves the valve stem such that the valve stem moves the valve member between the first and second locations within the valve body.

In the above and other illustrative embodiments, the valve assembly may further comprise: when the head is not engaged with the at least one surface of the valve stem, movement of the head is relative to the valve stem and the valve stem does not move the valve member; a lock that selectively engages the valve stem; when the lock is engaged to the valve stem the lock limits movement of the head to the extent that the head cannot engage the at least one surface on the valve stem which prevents the head from moving the valve stem to move the valve member, and wherein when the lock is not engaged to the valve stem the lock does not limit movement of the head such that the head is selectively engageable with the at least one surface on the valve stem such that movement of the head moves the valve stem such that the valve stem moves the valve member; a detent located adjacent the head; the head including a first cavity, a second cavity, and a third cavity such that the detent is sized to be selectively received in the first cavity, the second cavity, and the third cavity; and when the detent is located in the first cavity the head is held such that the valve member is positioned at the first location within the valve body, wherein when the detent is located in the second cavity the head is held such that the valve member is positioned at the second location within the valve body, and wherein when the detent is located in the third cavity, the head is movable such that the valve member is movable between the first and second locations within the valve body.

Another illustrative embodiment of a security blow-out-proof valve assembly provides a valve assembly which comprises: a valve body that contains a valve member movable between open and closed positions within the valve body; a valve stem extending from the valve body; wherein the valve stem moves the valve member between open and closed positions within the valve body; a head located on the valve stem and is selectively movable relative to the valve stem and selectively moves the valve stem; wherein when the head selectively moves the valve stem the head moves the valve member between open and closed positions; and a lock that selectively limits movement of the head.

In the above and other illustrative embodiments, the valve assembly may further comprise: the valve stem including an at least one surface such that the head is selectively engagable with the at least one surface of the valve stem to move the valve member between open and closed positions; the lock being engageable with the valve stem to selectively limit the movement of the head; a detent located adjacent the head wherein the head includes a first cavity, a second cavity, and a third cavity such that the detent is sized to be selectively received in the first cavity, the second cavity, and the third cavity; and the head being a T-shaped head.

Additional features and advantages of the security blow-out-proof valve assembly will become apparent to those skilled in the art upon consideration of the following detailed descriptions exemplifying the best mode of carrying out the security blow-out-proof valve assembly as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
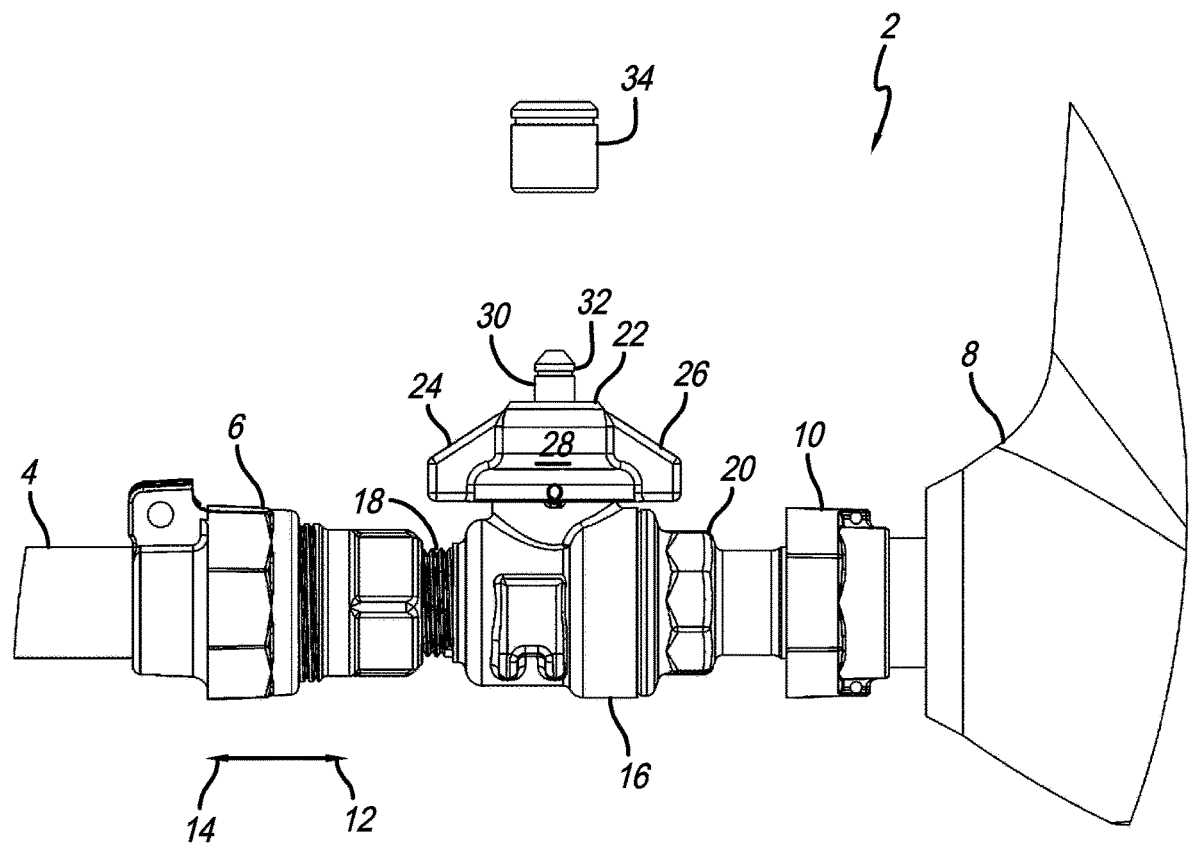
FIG. 1 is a side view of an illustrative embodiment of a security blow-out-proof valve assembly.

Corresponding reference characters indicate corresponding parts throughout the several views. The exemplification set out herein illustrates embodiments of the security blow-out-proof valve assembly, and such exemplification is not to be construed as limiting the scope of the security blow-out-proof valve assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a ball-valve assembly that is both lockable, to prevent unauthorized opening or closing of the ball-valve, and includes a blow-out-proof stem to prevent pressure increases that cause failure at the valve stem. In an illustrative embodiment, a head or T-head will be provided that is configured to rotate the blow-out-proof stem which moves the ball inside the valve body between open and closed positions. Accordingly, as the T-head pivots so too does the valve stem. The T-head is retained. It does not separate from the valve assembly. Once the locking device is removed, it may rise above the detent on the valve body allowing it to rotate to any of a plurality of defined positions—fixed open, fixed closed, actuating, or anywhere in between.

In an illustrative embodiment, the T-head may include an open cavity portion, closed cavity portion, and actuating range slot which controls operation of the T-head. A portion of the valve body located adjacent to the valve stem may include a detent that is engageable with one of either the open or closed cavities, or the actuating range slot, at one time. The T-head is also movable independently of the valve stem so that the T-head may be positioned to engage the detent at one of the three foregoing locations. For example, if the valve is open and it is desired to remain open, the T-head may be moved with respect to the valve stem so that the T-head's open cavity may engage the detent on the valve body. In this configuration, the detent holds the T-head in place preventing same from rotating or pivoting the valve stem. This prevents the ball-valve from moving to another position. In other words, the detent located in the open cavity locks the valve in the open position. Likewise, if the valve is in a closed position, the closed cavity of the T-head may engage the detent on the valve body to prevent the T-head from pivoting the valve stem. This locks the valve in its closed position. The T-head will have to be moved relative to the detent and repositioned in order to pivot the valve stem. Otherwise, the detent in the closed cavity of the T-head locks same into the locked position.

In order to move the ball-valve, via the blow-out-proof valve stem between open and closed positions, the T-head needs to be moved once again relative to the valve stem so that the detent on the valve body is located in the actuating range slot formed in the T-head. Once in this position, the T-head may be rotated in similar fashion to a conventional ball-valve actuator to move the ball inside the valve housing between the open and closed positions. This is accomplished by the T-head pivoting the valve stem which moves the ball. Once that ball is located in the desired position, whether open or closed, the T-head may be moved relative to the valve stem so either the open or closed cavity of the T-head engages the detent to secure the T-head in the corresponding open or closed position.

An illustrative embodiment of a security blow-out-proof valve assembly 2 is shown in FIG. 1. Security blow-out-proof valve assembly 2 is shown connected to a pipe 4 via coupling 6 on one side and another structure such as a water meter 8, for example, on the other side. This assembly may be of many types with integral connections, couplings, water works components, and/or any other plumbing style fittings. In this demonstrative, fluid may be sourced through pipe 4 moving in direction 12 to flow into water meter 8. Security blow-out-proof valve assembly 2 is located between pipe 4 and water meter 8 to selectively permit fluid to enter or restrict fluid from entering water meter 8. Furthermore, the security features further discussed herein are designed so that once security blow-out-proof valve assembly 2 has been set to either the open or closed position, it cannot be changed without specific tool(s) that allow this to be done.

Security blow-out-proof valve assembly 2 includes a valve body 16 flanked by first end 18, and opposing second end 20. It is appreciated that both first and second ends 18 and 20, respectively, may be threaded or not threaded, depending on what couplings will be attached. First and second ends 18 and 20, respectively, provide fluid communication from other structures that will be connected to security blow-out-proof valve assembly 2 and valve body 16. Inside valve body 16 is a ball 70 (see FIG. 3) that is adjusted by head or T-head 22 to either the open or closed positions. Accordingly, an illustrative embodiment of the present disclosure is directed to only allowing T-head 22 to move the ball-valve under certain conditions. The illustrated embodiment of T-head 22 is a wing structure having flanges 24 and 26 extending from a central body 28. Head 22 or 128 (see, also, FIG. 13) may also have integral wrench flats, a custom attachable handle, or an integral handle design. The skilled artisan will appreciate upon reading this disclosure that such head structure may take alternative forms, such as a wrench flat, separate handle attachable to the head, or an integral handle. It will be further appreciated that all of these variants are included within the scope of this disclosure.

Also shown in FIG. 1 is blow-out-proof stem 30. T-head 22 is configured to rotate blow-out-proof stem 30, which is coupled to ball 70 (see FIG. 3) to rotate same, thereby opening or closing security blow-out-proof valve assembly 2. Also shown with respect to blow-out-proof stem 30 is illustrative slot 32 that is configured to engage lock seal head 34 separated therefrom. When lock seal head 34 is engaged onto blow-out-proof stem 30 it couples to slot 32 and is not able to be removed unless special tools are employed to remove it. The lock seal head 34 or barrel lock 136 (see FIG. 13) employs a mating custom key produced by a lock manufacturer. In the case of lock seal head 34, the key is inserted into key hole 66 (see FIG. 2) disengaging tabs 84 (see FIG. 3) from slot 32 allowing lock seal to be removed. In the case of barrel lock 136 (see FIG. 13), the key is inserted into key hole 146 disengaging detents 140 and 142 from slot ring 144 (see FIG. 14) allowing barrel lock to be removed.

As will be further seen herein, adjusting security blow-out-proof valve assembly 2 to an either closed or open position depends on the particular orientation of T-head 22. As such, if T-head 22 is not oriented in an actuating range position, it will not rotate blow-out-proof stem 30, thereby not allowing any adjustment of the ball-valve. The only way to orient T-head 22 to the actuating range position to open or close the valve is to lift it relative to blow-out-proof stem 30, rotate, and lower back onto same. Lock seal head 34 prevents T-head 22 from being raised with respect to blow-out-proof stem 30, thus preventing T-head 22 from being oriented to the actuating range location. Only when lock seal head 34 is moved or removed can T-head 22 be reoriented.

Figure 2:
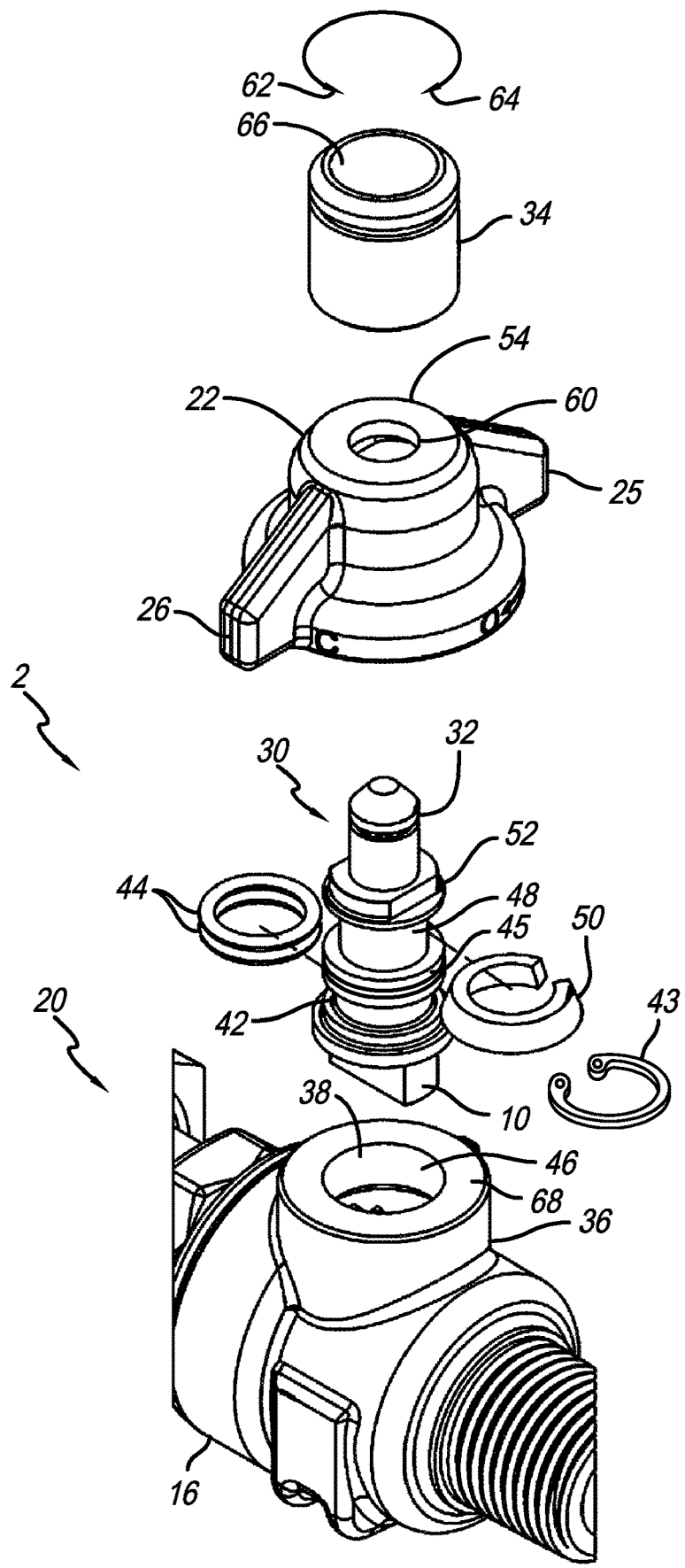
FIG. 2 is an exploded perspective view of the illustrative embodiment of the security blow-out-proof valve assembly.

An exploded view of security blow-out-proof valve assembly 2 is shown in FIG. 2. Valve body 16 is shown with ends 18 and 20 extending therefrom. A neck 36 extends illustratively perpendicular or about perpendicular from valve body 16. A bore 38 is disposed through neck 36 to provide access to ball 70 (see FIG. 3). Blow-out-proof stem 30 is also configured to be disposed in bore 38 of neck 36 to connect to ball 70. Blow-out-proof stem 30 includes a key plug 40 configured to engage ball 70 to move same (see FIG. 3). A recessed section 42 is configured to receive an O-ring 44 (see FIG. 3) configured to sandwich between recessed section 42 and wall surface 46 of bore 38. This creates a seal within the interior of valve body 16. A groove 45 is located in blow-out-proof stem 30 for receiving a retaining ring 43 to help movably secure blow-out-proof stem 30 with neck 36. A second recessed section 48 spaced apart from recessed section 42 is configured to receive lock ring 50. As will be demonstrated further herein, lock ring 50 retains T-Head 22 to blow-out-proof stem 30 and valve assembly 16. Blow-out-proof stem 30 only allows the T-head 22 to travel the length of space 87 (see FIG. 3). T-Head 22 may only be lifted above detent 68, but not completely removed. It is appreciated that ball 70 is actuated to its desired position before moving T-Head 22 to either fixed position.

Spaced apart from second recessed section 48 is engagement edge 52 which, as further demonstrated herein, engages interior engagement edge 54 of T-head 22. This engagement between engagement edge 52 and interior engagement edge 54 is what rotates blow-out-stem 30 with respect to valve body 16 to open and close ball 70. Also shown is opening 60 in T-head 22. Opening 60 is configured to receive the end of blow-out-proof stem 30.

Further, with respect to blow-out-proof stem 30, slot 32 is illustratively located adjacent the top edge of blow-out-proof stem 30. Slot 32 is configured to engage lock seal head 34 in order to prevent T-head 22 from moving vertically in either directions 56 or 58. Because of that, as will be demonstrated further herein, T-head 22 is limited in its ability to rotate to open or close ball 70 inside valve body 16. T-head 22 includes opening 60, configured to receive a portion of blow-out-proof stem 30. Key hole 66 will receive the key to remove lock seal head 34 allowing T-Head 22 to lift above detent 68 and change position. Flanges 24 and 26 illustratively provide the gripping surface that allows T-head 22 to rotate blow-out-proof stem 30 in directions 62 and 64. In this illustrative embodiment, lock seal head 34 includes key hole 66 configured to receive a portion of blow-out-proof stem 30. Lastly in this view, detent 68 is illustratively located on neck 36 of valve body 16. As also discussed further herein, detent 68 engages T-head 22 to either hold T-head 22 in an open position, closed position, or actuating range position—allowing T-head 22 to pivot in directions 62 or 64 to open or close ball 70.

Figure 3:
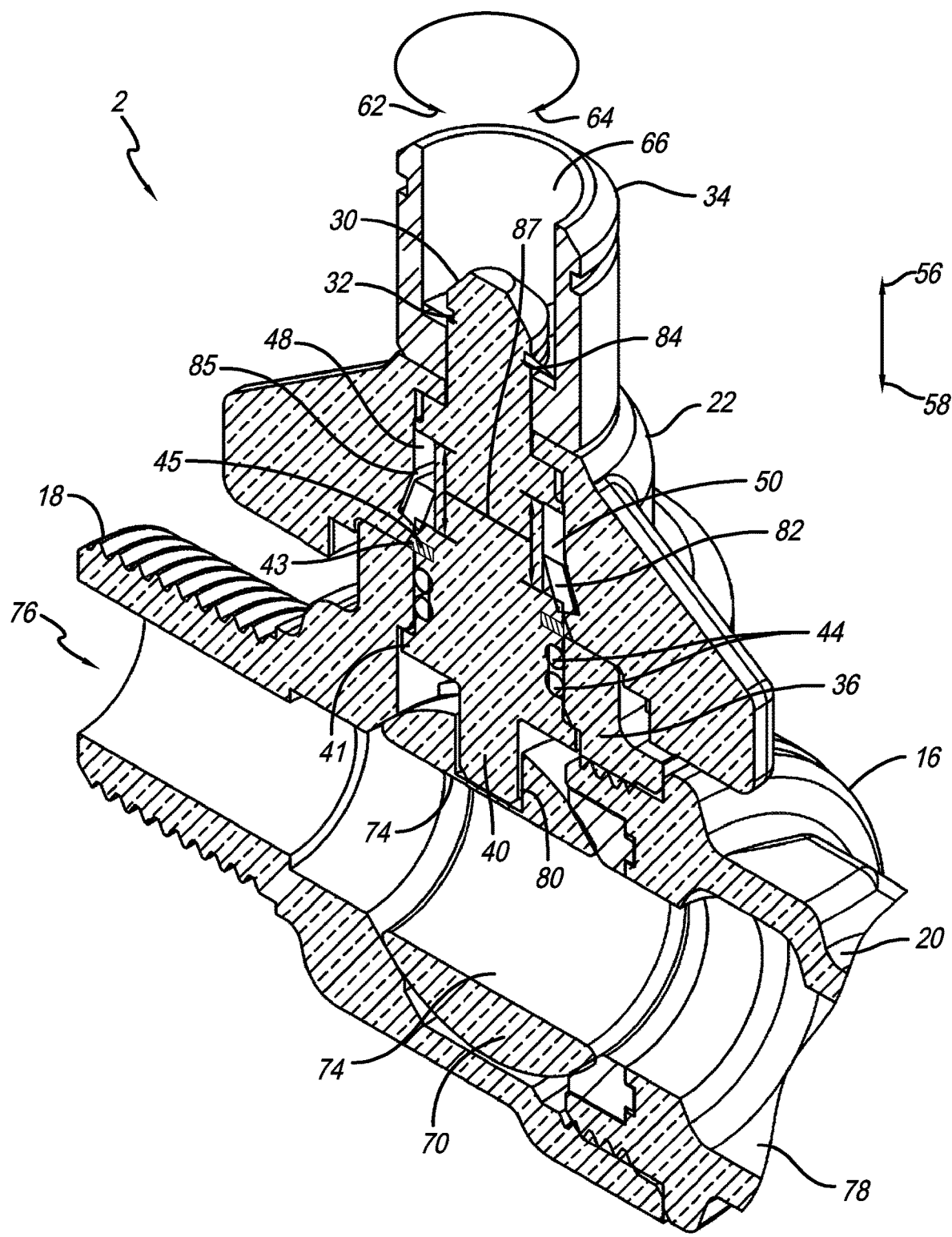
FIG. 3 is a perspective cross-sectional view of the security blow-out-proof valve assembly.

A cross-sectional view of security blow-out-proof valve assembly 2 is shown in FIG. 3. This view shows ball 70 located in bore 72 of valve body 16. This view depicts ball 70 with its pass-through bore 74 positioned in an open position allowing fluid to pass from bore 76 of first end 18 through to bore 78 of second end 20. Also shown herein is key plug 40 located in receptacle 80 of ball 70 which is the engagement allowing blow-out-proof stem 30 to pivot ball 70. O-ring 44, also shown, creates a seal between wall surface 46 of bore 38 and neck 36, thereby creating a seal between blow-out-proof stem 30 and neck 36. Groove 45 is shown in blow-out-proof stem 30 receiving retaining ring 43. Lock ring 50 is also shown engaging a cavity 82 adjacent channel 85 within T-head 22. It is appreciated from this view, how engagement, along with the sizing of second recessed section 48 in blow-out-proof stem 30, allows a path of travel for T-head 22 in directions 56 and 58. Limiting this, however, is lock seal head 34 as shown. Lock ring 50 retains T-head 22 of blow-out-proof stem 30, only allowing travel in directions 56 and 58, a limited distance provided by space 87. Once T-head 22 is raised above detent 68, T-head 22 may now move freely in directions 62 or 64. Tabs 84, within key hole 66 of lock seal head 34, engages slot 32 of blow-out-proof stem 30. In this particular view, T-head 22 is unable to move in direction 56. As will be shown further herein, this means T-head 22 may not move with respect to detent 68 (see FIGS. 2, 6A, and 7A) to be repositioned to adjust positioning of ball 70. A path of travel or distance range of lock ring 50, however, is indicated by space 87 when T-head 22 is able to move.

Illustratively, T-head 22 is moved relative to blow-out-proof stem 30 by partially lifting the T-head 22. It is appreciated that T-head 22 or 128 (see, also, FIG. 13) remains retained to the valve assembly by lock ring 50 or 126. Space 87 allows T-head 22 or 128 to lift above the detent 68 or 154 to allow T-head 22 or 128 to change position. Once in position, T-head 22 or 128 will lower and reengage detent 68 or 154 (see, also, FIG. 13) where lock 34 or post portion 138 (see, also, FIG. 13) may be reinstalled to lock T-head 22 or 128 into a fixed open, fixed closed, actuating position, or anywhere in between. Illustratively, a lock seal head, which can only be removed with a corresponding key, can be secured onto the valve stem to prevent the T-head from either being lifted or removed from the valve stem without the lock seal head being removed first. Accordingly, an installer may open or close the valve as desired, move the T-head to the desired cavity (either open or closed) on the T-head, then reinstall the lock seal head onto the valve stem. This will prevent anyone else from adjusting the valve any further without having the proper key for the lock seal head to remove same. Also shown in this view is flange portion 41 of blow-out-proof stem 30 that maintains same in neck 36.

Figure 4:
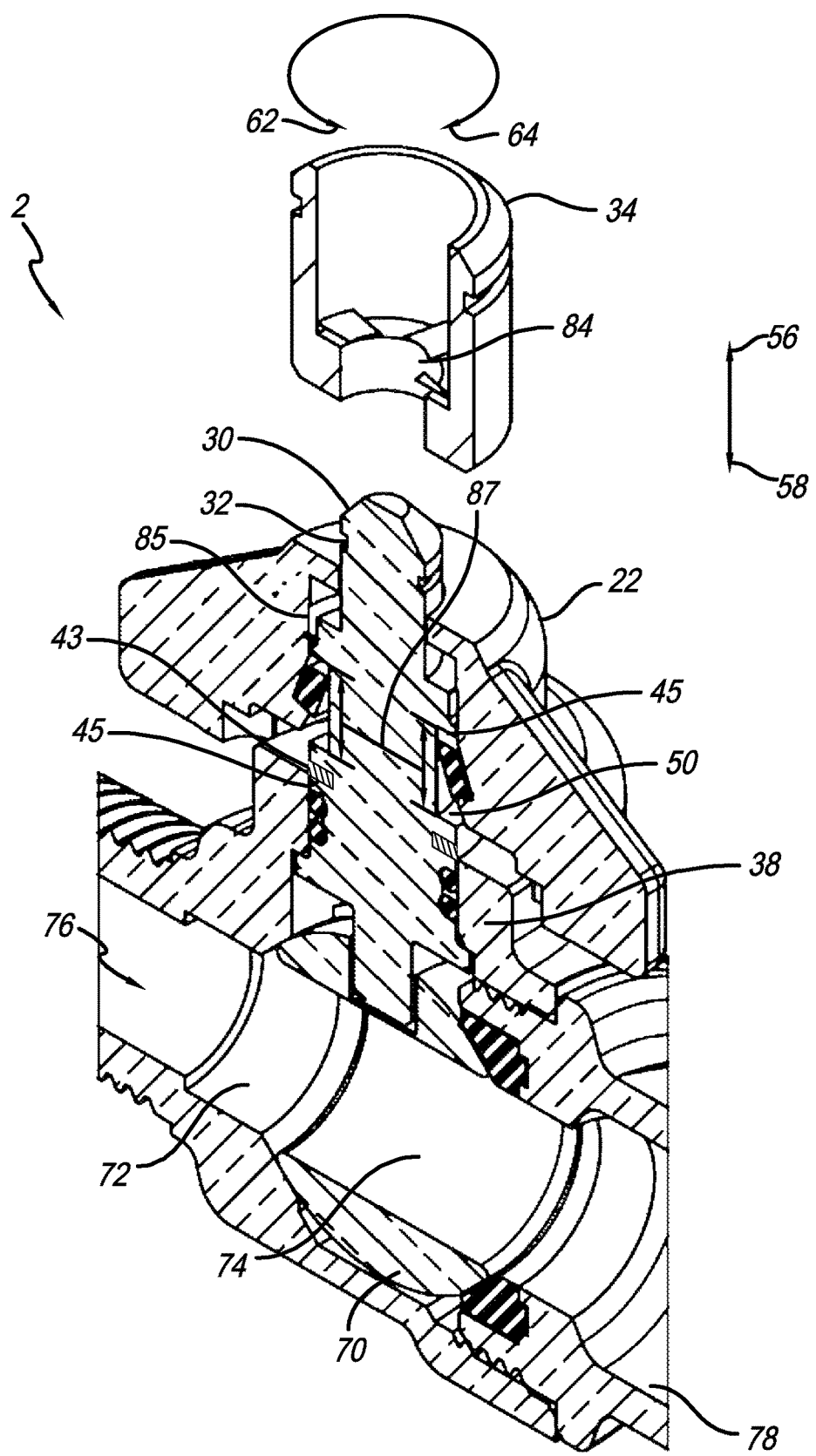
FIG. 4 it is another perspective cross-sectional view of the security blow-out-proof valve assembly.

Another perspective cross-sectional view of security blow-out-proof valve assembly 2 is shown in FIG. 4. This view, similar to that shown in FIG. 3, except here lock seal head 34 has been removed from blow-out-proof stem 30. This means T-head 22 is movable in direction 56, thereby raising same with respect to neck 36 of valve body 16. When doing this, a range of motion is available to T-head 22 via distance range indicated by space 87 by virtue of lock ring 50 fitted in second recessed section 48. This path of travel in directions 56 or 58 by T-head 22, as shown further herein, allows T-head 22 to avoid engagement with detent 68. This allows T-head 22 to rotate as needed in directions 64 or 62 in order to rotate blow-out-proof stem 30 which rotates ball 70 to either its open or closed position.

Figure 5A:
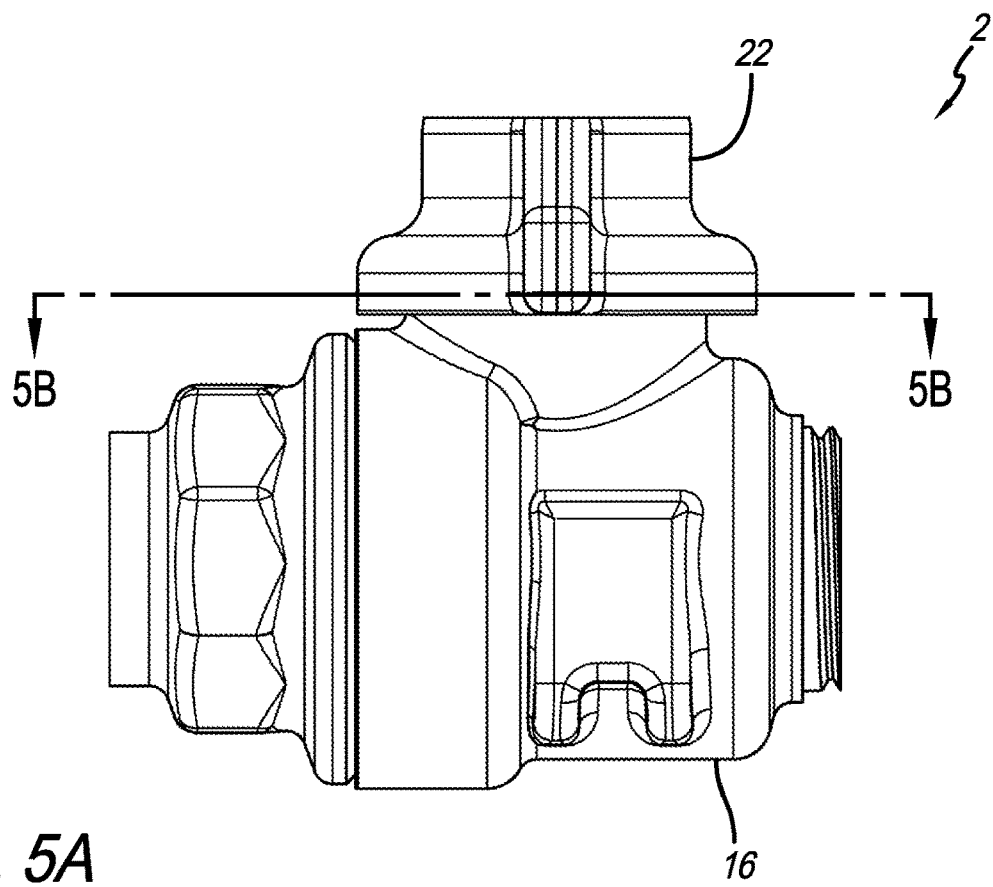
FIG. 5A is a side view of a valve body of the security blow-out-proof valve assembly.
Figure 5B:
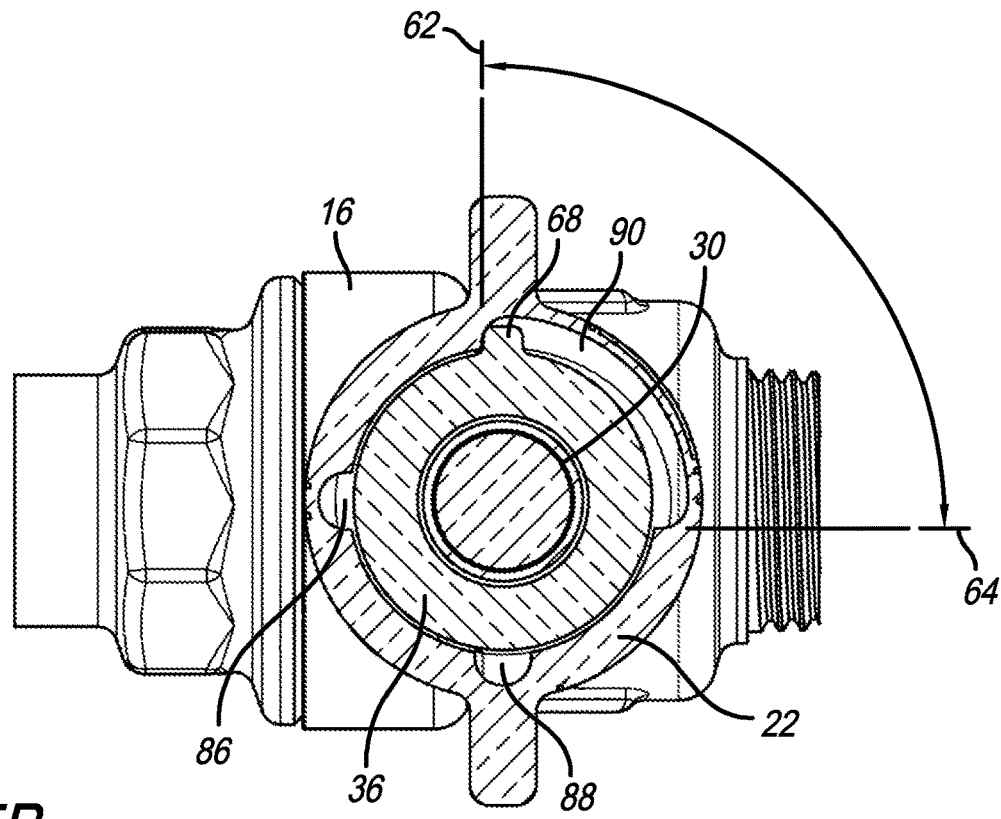
FIG. 5B is a top cross-sectional view of the valve body of the security blow-out-proof valve assembly.

A side view of valve body 16, with T-head 22 located thereon, is shown in FIG. 5A. A top view of both valve body 16 and T-head 22 in perspective cross-section taken along line A-A of FIG. 5A, is shown in FIG. 5B. This latter view depicts how T-head 22 may be used to rotate blow-out-proof stem 30 or lock same in place. As particularly shown in FIG. 5B, neck 36 of valve body 16 includes detent 68 extending outwardly therefrom. Detent 68 is configured to engage certain portions of T-head 22 to either lock T-head 22 in place or allow T-head 22 to move ball 70 inside valve body 16. As shown in FIG. 5B, T-head 22 includes a lock open notch 86, lock closed notch 88, and an actuating range slot 90. When T-head 22 is moved so that detent 68 fits in lock open notch 86, valve ball 70 is intended to be held in its open position allowing fluid to flow through. When detent 68 is located in lock closed notch 88, ball 70 is intended to be held in its closed non-flow position. Lastly, when detent 68 is located in actuating range slot 90, as shown in FIG. 5B, T-head 22 is pivotable in either directions 62 or 64 in order to pivot blow-out-proof stem 30, which will move ball 70 inside valve body 16 to either the open or closed position. Accordingly, T-head 22 is configured to either be held in an open, closed, or actuating positions.

As part of the security feature of security blow-out-proof valve assembly 2, T-head 22 is intended to be held in one of the three foregoing positions and not able to be changed without lock seal head 34, or other like structure, being removed. Presumably, lock seal head 34, or other like structure, may only be removed by authorized personnel with specialized tools.

Without such removal, T-head 22 is essentially locked in one of the three foregoing positions.

Figure 6A:
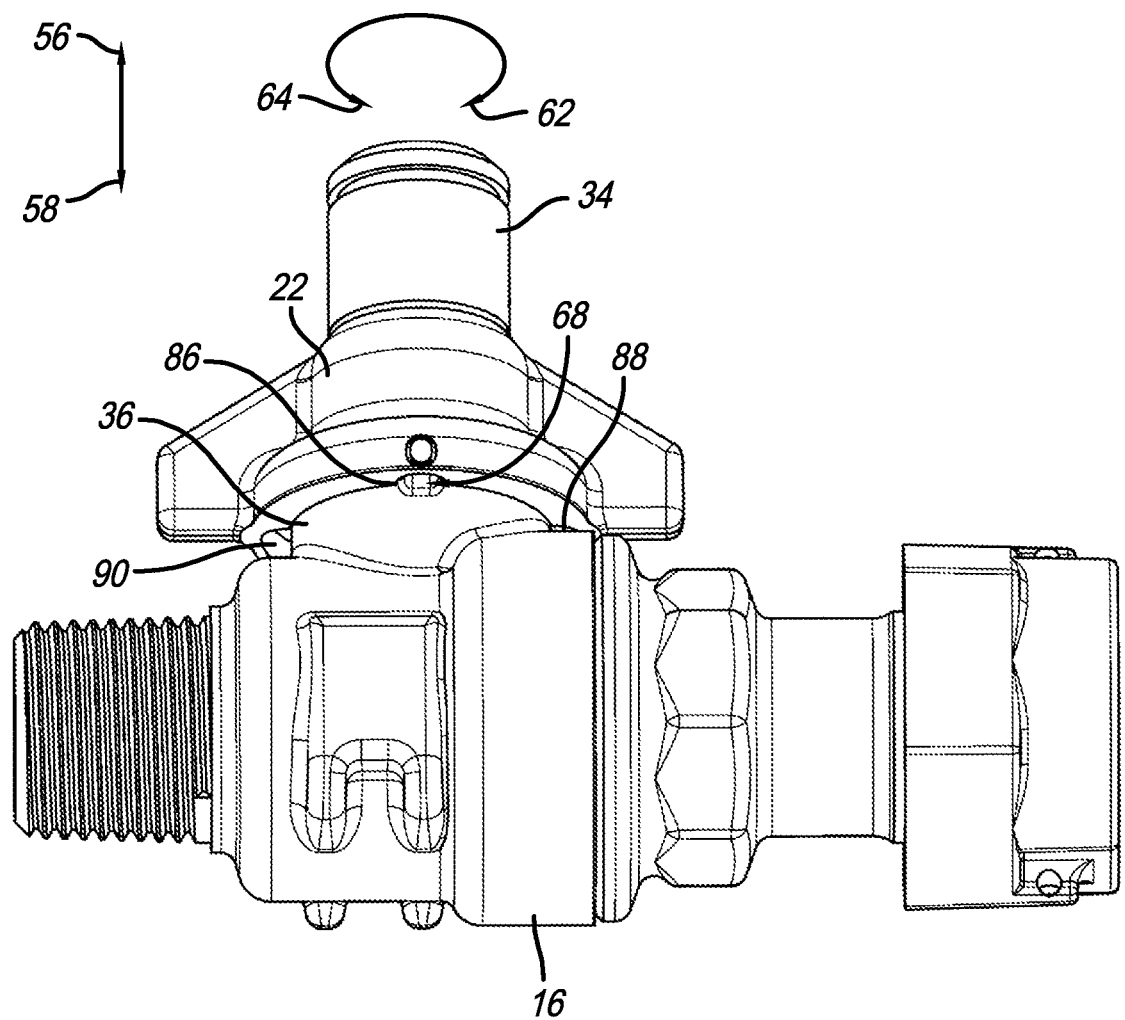
FIG. 6A is side elevational view of the security blow-out-proof valve assembly.
Figure 6B:
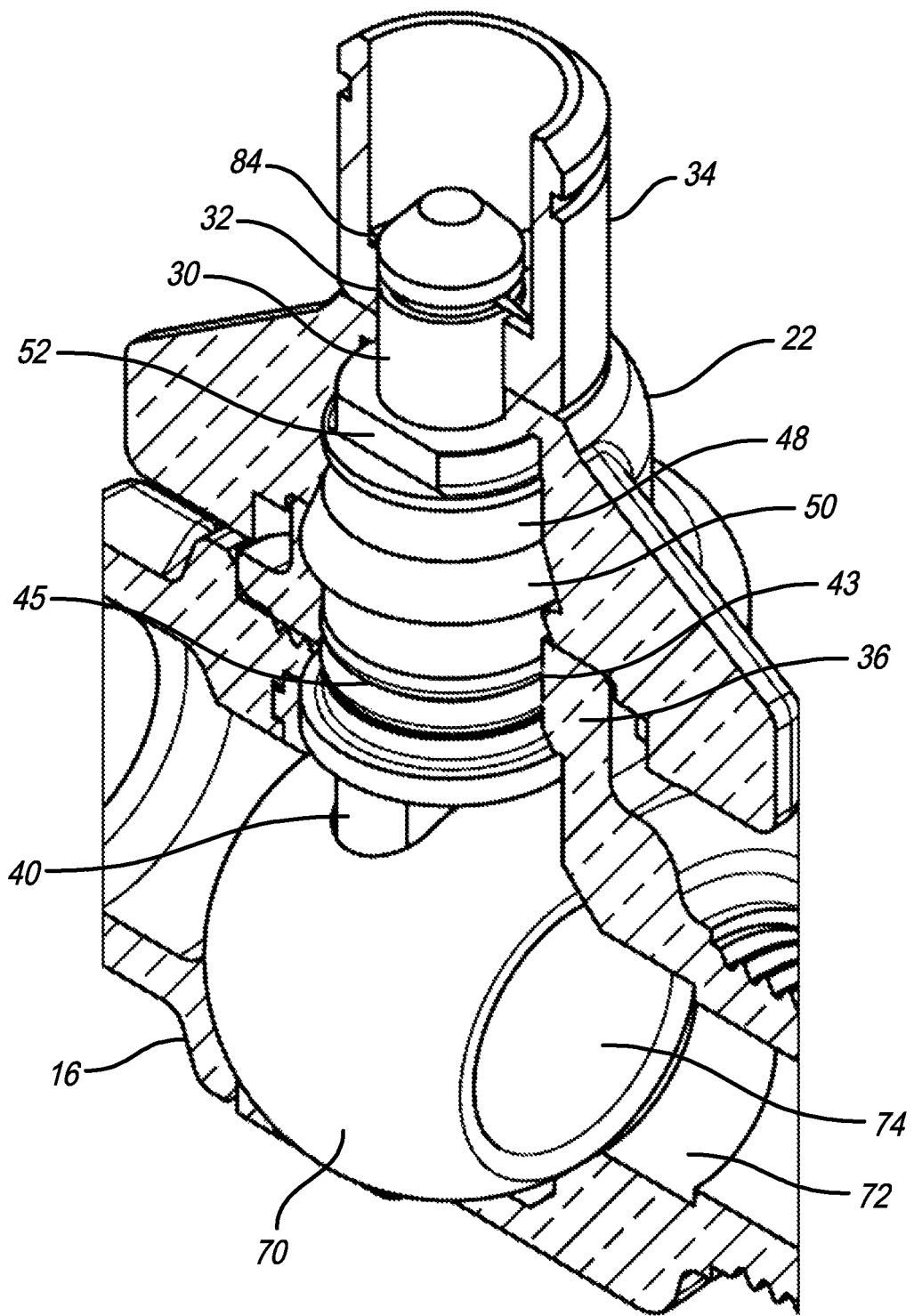
FIG. 6B is a side perspective cross-sectional view of the security blow-out-proof valve assembly.

The view in FIGS. 6A and 6B are side elevation and perspective cross-sectional views, respectively, of security blow-out-proof valve assembly 2. As specifically shown in FIG. 6A, detent 68 of neck 36 is fitted in lock open notch 86. Because lock seal head 34 is installed, T-head 22 cannot move upward in direction 56 to clear detent 68. This means detent 68 will hold T-head 22 in position preventing T-head 22 from rotating in either direction 62 or 64. In this position, security blow-out-proof valve assembly 2 essentially locks ball 70 in the open position.

The cross-sectional view of FIG. 6B further emphasizes this condition. Ball 70 is located in valve body 16 in the open position which cannot be changed so long as lock seal head 34 is coupled onto blow-out-proof stem 30. This prevents T-head 22 from rising upward in direction 56 to clear detent 68, and reposition ball 70. With tab 84 engaged in slot 32 of blow-out-proof stem 30, lock seal head 34 is unable to be moved without appropriate tools. With ball 70 located in an open position, fluid is free to flow through pass-through bore 74.

Figure 7A:
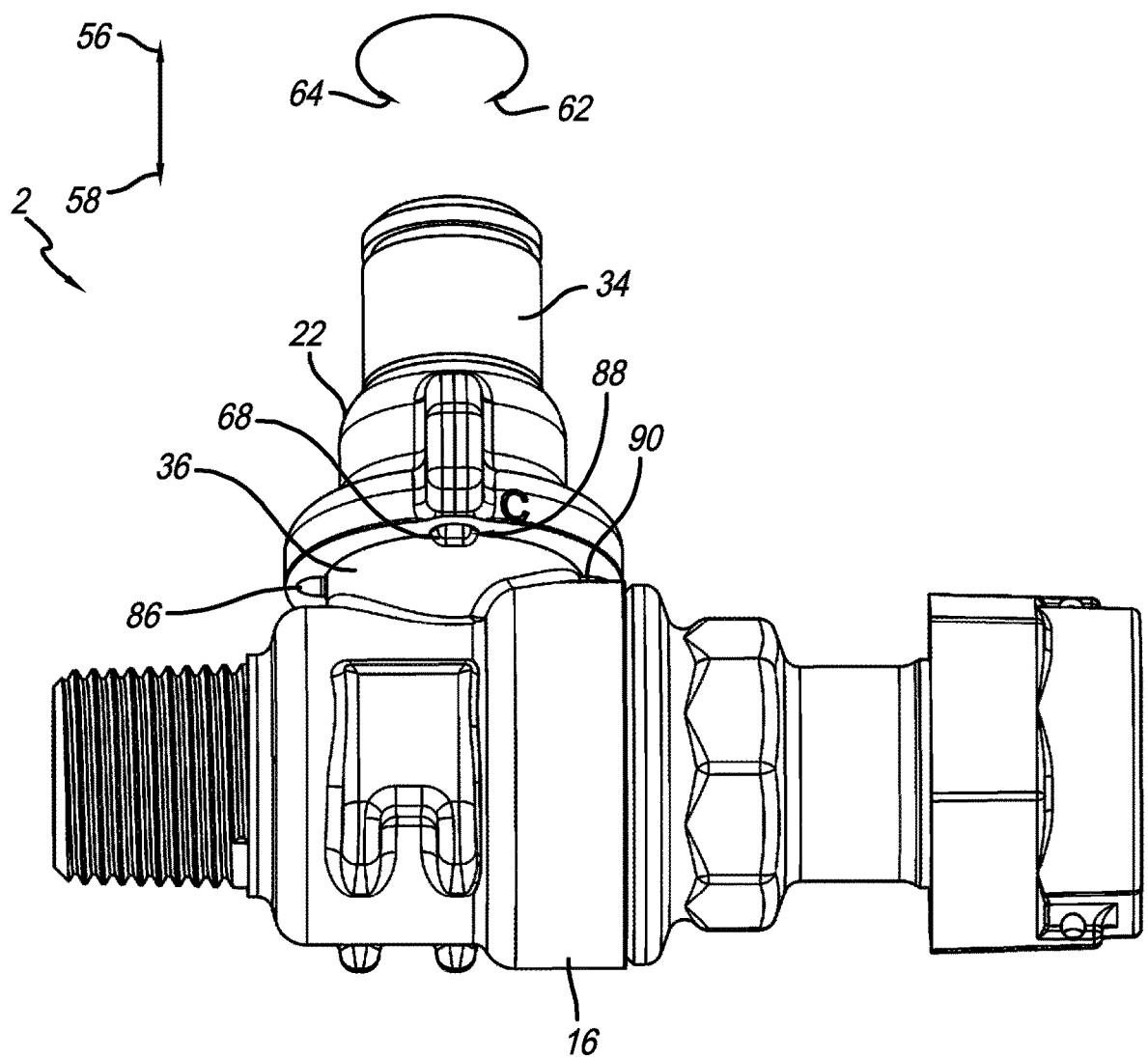
FIG. 7A is another side elevational view of the security blow-out-proof valve assembly.
Figure 7B:
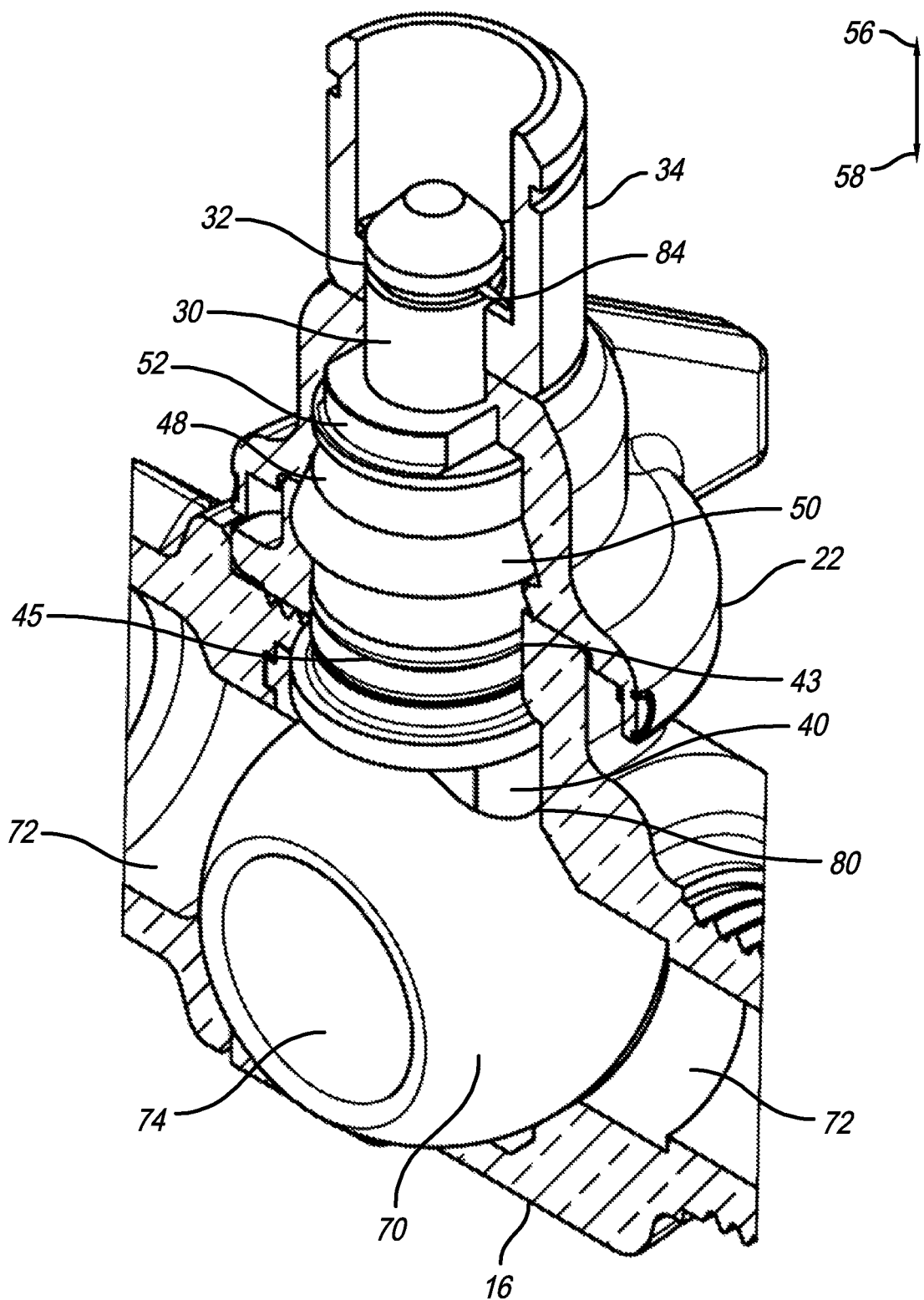
FIG. 7B is another perspective cross-sectional view of the security blow-out-proof valve assembly.

Similar side elevation and perspective cross-sectional views, respectively, of security blow-out-proof valve assembly 2 is shown in FIGS. 7A and 7B. These views show the same structures as those in FIGS. 6A and 6B. The difference is that lock seal head 34 had been removed and T-head 22 raised in direction 56 and rotated in either direction 62 or 64. Lock seal head was then lowered in direction 58, repositioned so detent 68 on neck 36 is fitted into lock closed notch 88, as shown in FIG. 7A. In this position, T-head 22 is now locked in the closed position and cannot be further adjusted without lock seal head 34 being removed again to allow T-head 22 to rise. It is appreciated that lock seal head 34 is shown replaced back onto blow-out-proof valve stem 30. As shown in FIG. 7B, ball 70 is oriented in bore 72 such that fluid is blocked from one side of valve body 16 to the other. This means no fluid may pass-through and security blow-out-proof valve assembly 2 cannot be reopened without lock seal head 34 again being removed. It should be appreciated in this illustrative embodiment that T-head 22 is oriented so flanges 24 and 26 are perpendicular to the longitudinal extent of pass-through bore 74, to be indicative of a closed valve condition that is conventional of valves indicating either the open or closed position.

Figure 8A:
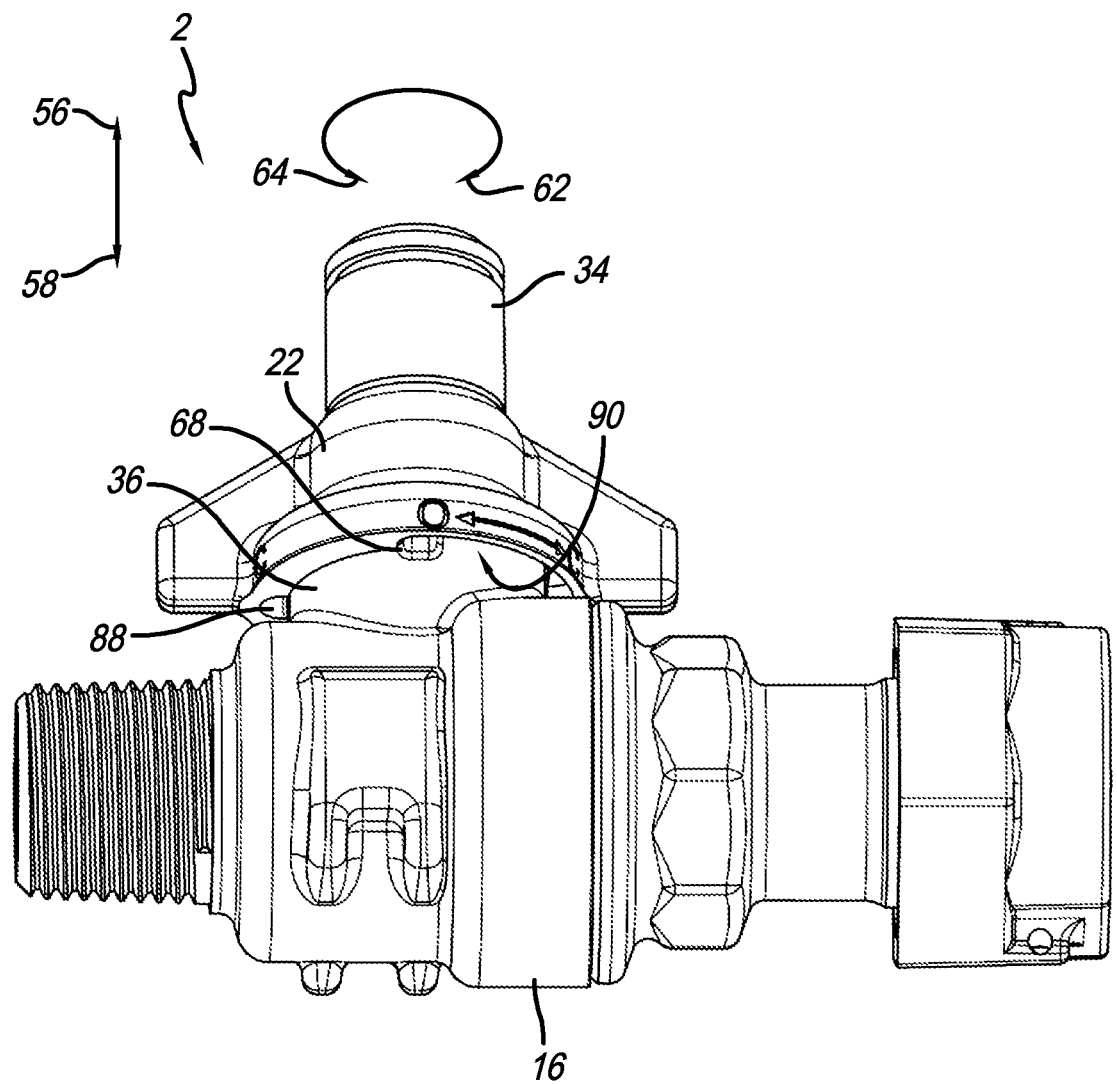
FIG. 8A is another side elevational view of the security blow-out-proof valve assembly.
Figure 8B:
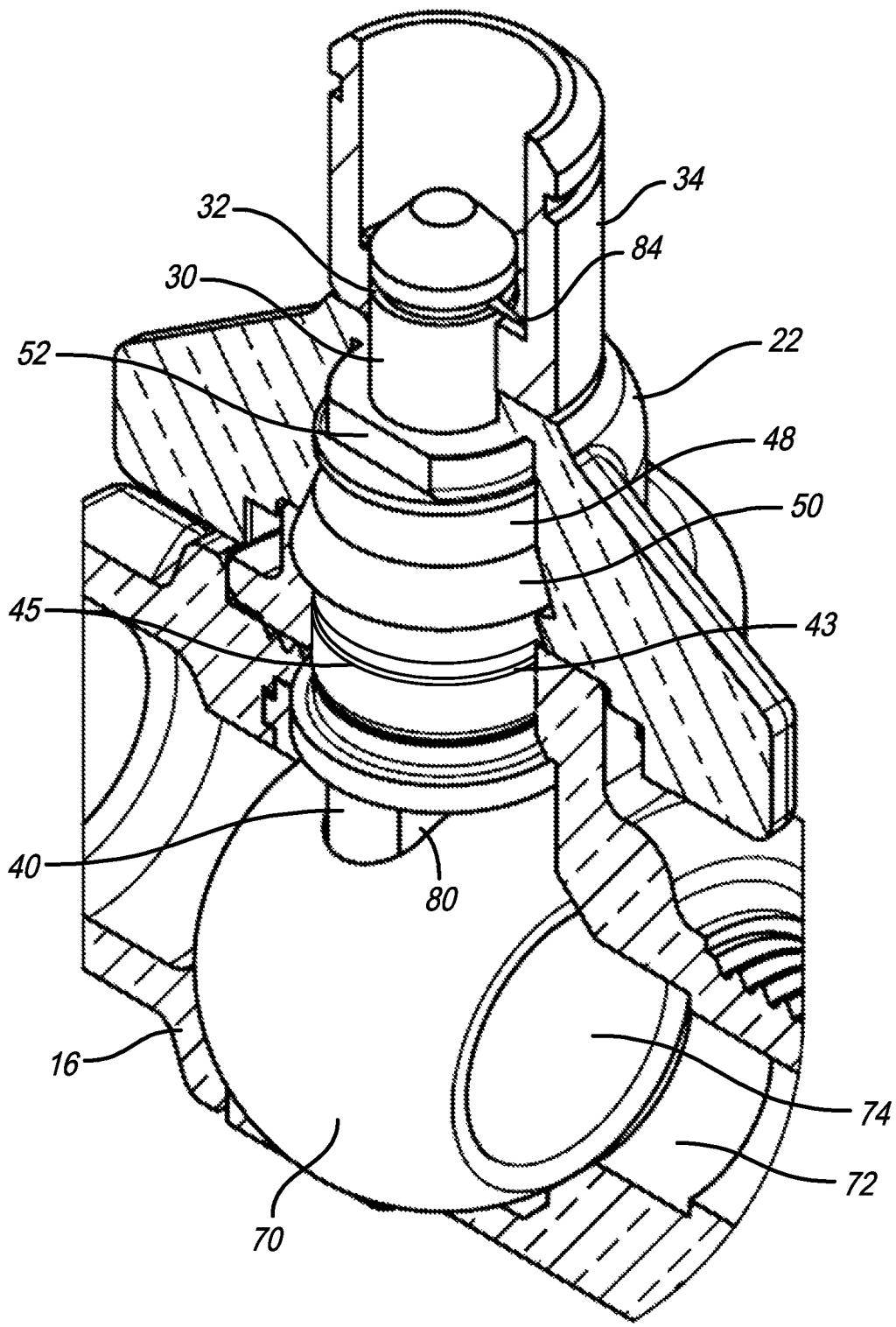
FIG. 8B is another perspective cross-sectional view of the security blow-out-proof valve assembly.

Side elevational and perspective cross-sectional views of security blow-out-proof valve assembly 2 are shown in FIGS. 8A and 8B, respectively. In FIG. 8A, again, the structures shown are the same as those shown in FIGS. 6A and 7A. This time, however, T-head 22 has been repositioned on neck 36 so that detent 68 is located in actuating range slot 90. Same as that previously discussed, in order for T-head 22 to get into this position, lock seal head 34 had to be removed, T-head 22 raised in direction 56 and rotated in either directions 62 or 64, lowered in direction 58 and relocated such that detent 68 fit into actuating range slot 90. As depicted herein, T-head 22 is rotatable on blow-out-proof stem 30 in either directions 62 or 64 to either open or close ball 70 inside valve body 16.

As specifically shown in FIG. 8A, T-head 22 has been rotated so that, illustratively, ball 70 is located in an open position. As depicted in the cross-sectional perspective view of FIG. 8B, ball 70 is oriented so pass-through bore 74 is oriented coincident with bore 72, in valve body 16, to allow fluid to flow through security blow-out-proof valve assembly 2. It is appreciated that T-head 22 rotates blow-out-proof stem 30 with detent 68 traveling in actuating range slot 90 until ball 70 is turned to this open position shown. Illustratively, with lock seal head 34 coupled to blow-out-proof stem 30, tabs 84 engaging slot 32 of blow-out-proof stem 30, T-head 22 has free range to rotate blow-out-proof stem 30 to open or close ball 70. In this illustrative embodiment, lock seal head 34 will need to be removed, T-head 22 raised in direction 56 and repositioned so that either one of the lock open notch 86 or lock closed notch 88 may be engageable with detent 68 to lock T-head 22, with respect to the remainder of the valve (see, also, FIG. 5B).

Figure 9A:
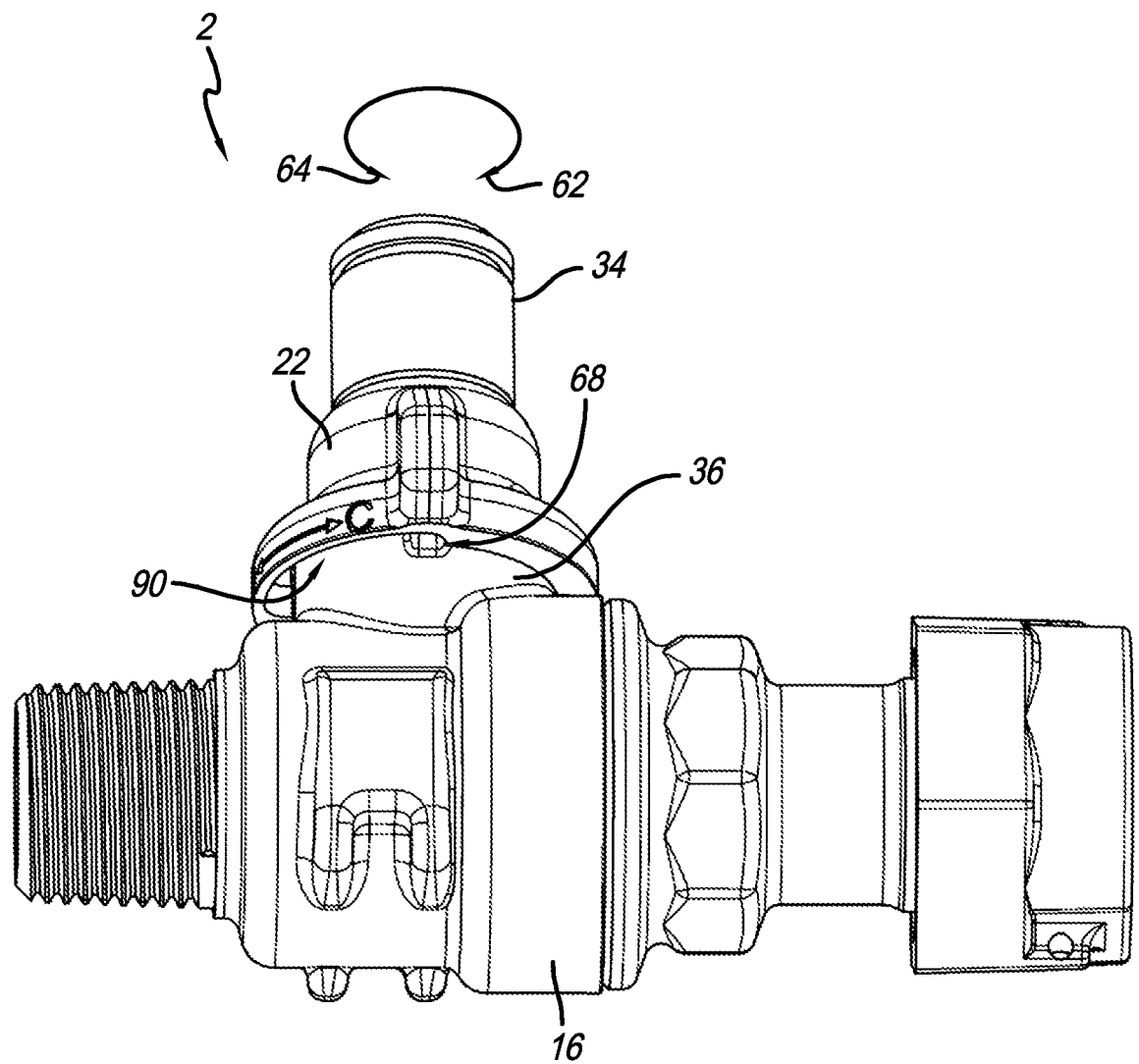
FIG. 9A is another side elevational view of the security blow-out-proof valve assembly.
Figure 9B:
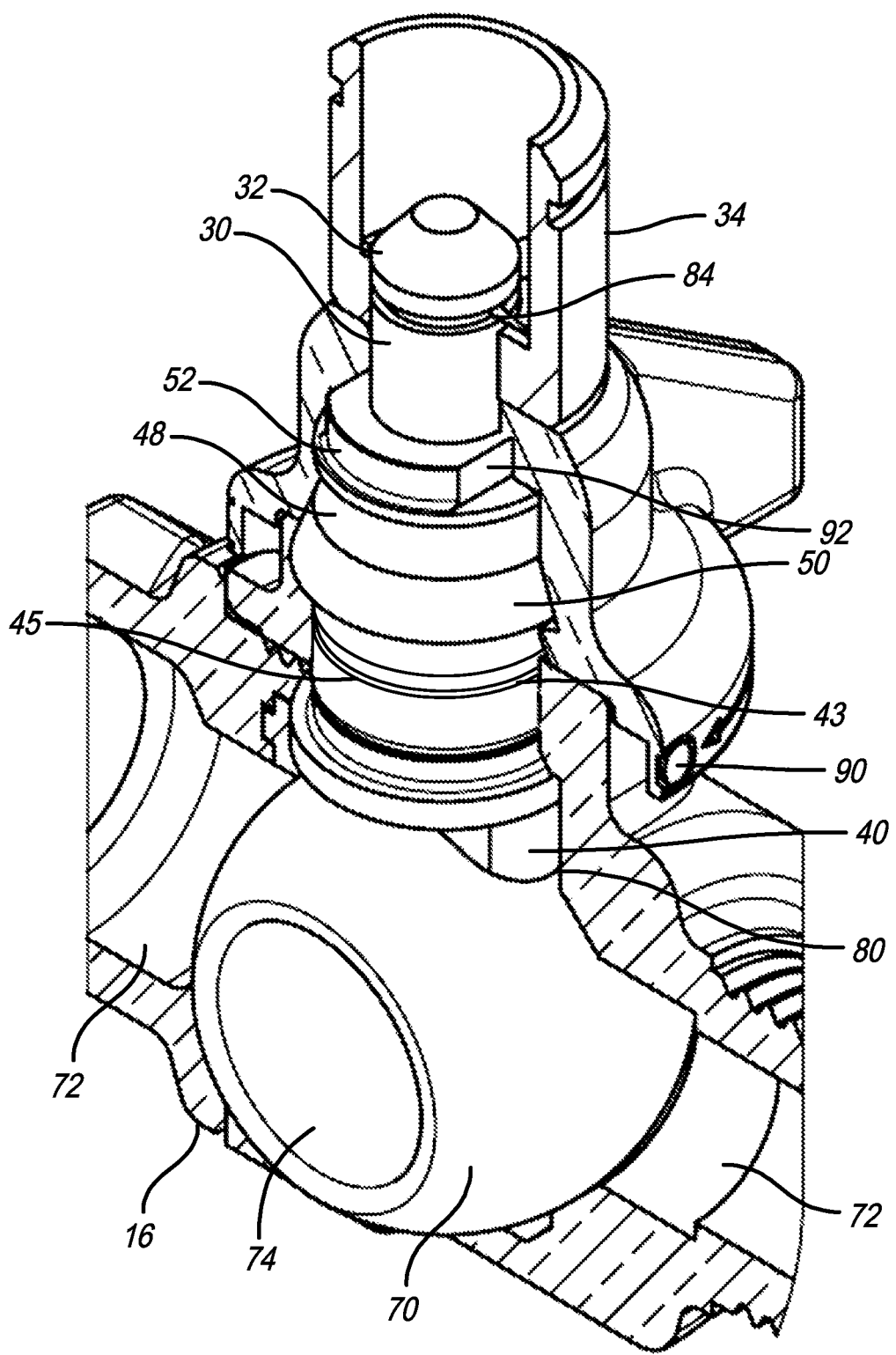
FIG. 9B is a another perspective cross-sectional view of the security blow-out-proof valve assembly.

As shown in the elevational and perspective cross-sectional views of security blow-out-proof valve assembly 2, FIGS. 9A and 9B, respectively, T-head 22 has been rotated in direction 62 to close ball 70 as indicated by detent 68 engaged at the opposite end of actuating range slot 90. As shown in FIG. 9B, ball 70 has been rotated by T-head 22 rotating blow-out-proof stem 30 so that pass-through bore 74 is no longer coincident with bore 72 of valve body 16. Contrasting FIGS. 8A and 8B with FIGS. 9A and 9B, the skilled artisan will appreciate upon reading this disclosure that rotating T-head 22 in directions 62 or 64 opens or closes ball-valve 70 inside valve body 16. It is further appreciated that as an illustrative embodiment, T-head 22 includes an engagement slot 92 sized and configured to engage contact edges 52 on blow-out-proof stem 30 in a keying type fashion so that rotating T-head 22 coincidently rotates blow-out-proof stem 30.

Figure 10:
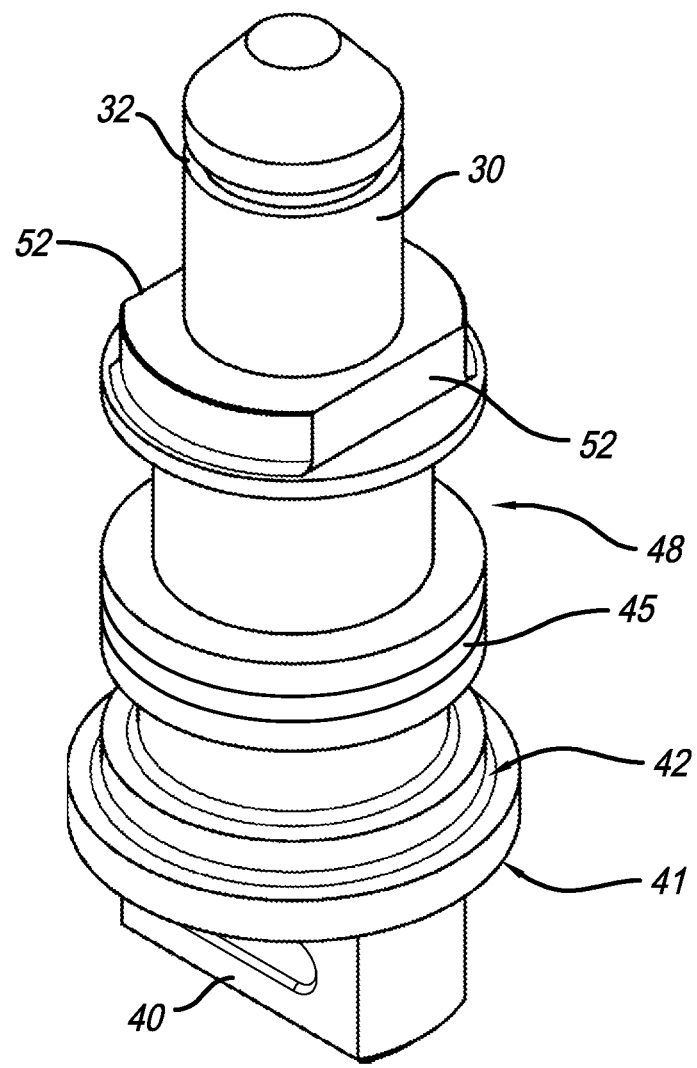
FIG. 10 is a perspective view of a blow-out-proof stem portion of the security blow-out-proof valve assembly.
Figure 11:
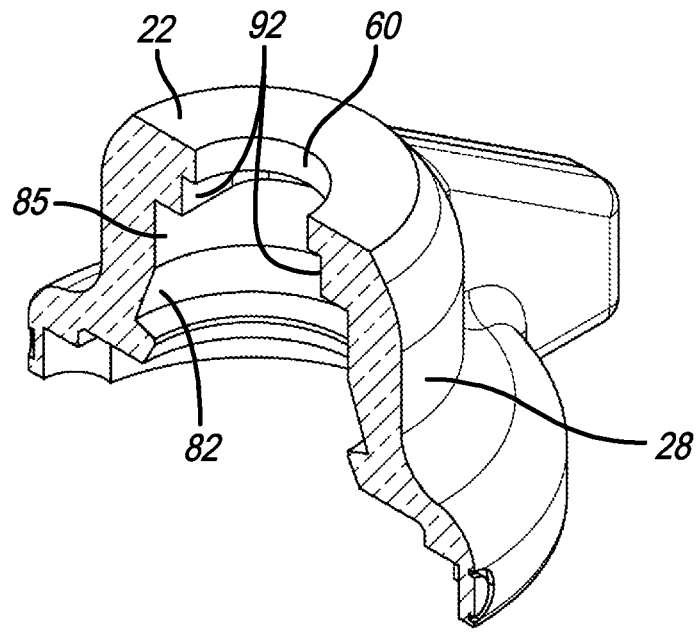
FIG. 11 is a cross-sectional perspective view of a T-head portion of the security blow-out-proof valve assembly.

A perspective view of blow-out-proof stem 30 is shown in FIG. 10. This view further depicts contact edges 52 which serve as a keying structure to the engagement slot 92 of T-head 22, as shown in FIG. 11. This keying/keyed engagement insures proper rotation of blow-out-proof stem 30 when T-head 22 rotates. This view of blow-out-proof stem 30 shows key plug 40, flange portion 41, recessed section 42, and second recessed section 48 spaced apart from recessed section 42. Spaced apart from second recessed section 48 are contact edges 52. Slot 32 is illustratively located adjacent the top of blow-out-proof stem 30. Also shown is groove 45 sized to receive retaining ring 43.

A cross-sectional perspective view of T-head 22 is shown in FIG. 11. Pursuant to the foregoing discussion, the keyed engagement slot 92 engages contact edges 52 of blow-out-proof stem 30 (see, also, FIG. 10). Also shown in this view is cavity 82 and channel 85 configured to receive lock ring 50 and second recessed section 48 of blow-out-proof stem 30. Lastly, opening 60 is show located adjacent engagement slot 92.

Figure 12:
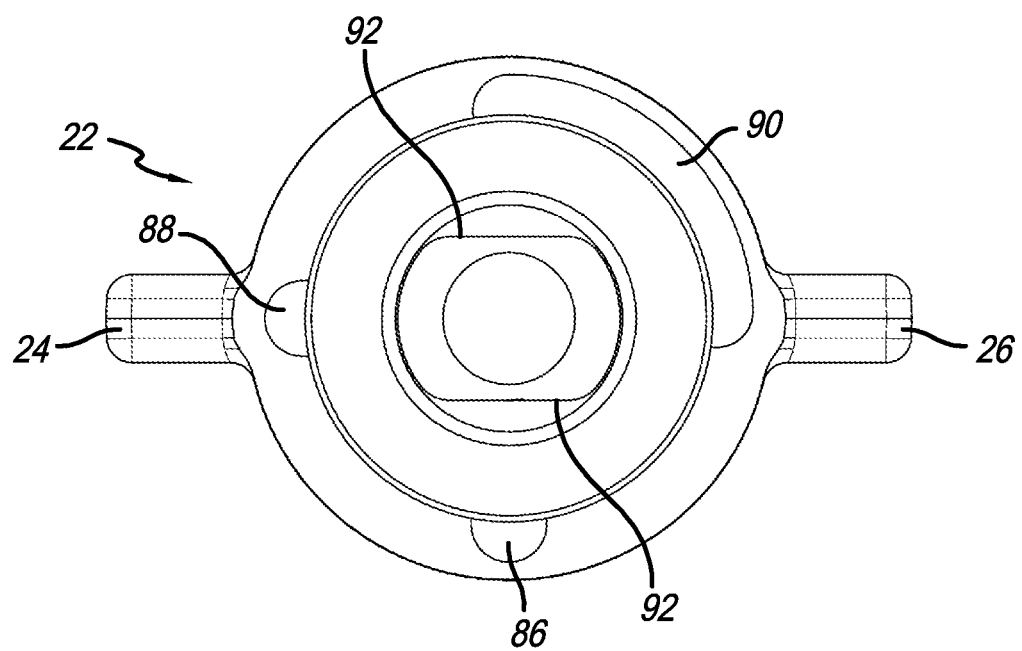
FIG. 12 is an underside view of the T-head of the security blow-out-proof valve assembly.

An underside view of T-head 22 is shown in FIG. 12. This view shows lock open notch 86, lock close notch 88, and articulating range slot 90. Also shown are engagement slot 92 previously discussed that fit onto contact edges 52 of blow-out-proof stem 30. This view also shows flanges 24 and 26 extending from central body 28 (see, also, FIGS. 1 and 11).

Another illustrative embodiment of the present disclosure provides a security blow-out-proof valve assembly 102 as shown in FIGS. 13-18. This embodiment is similar to the prior embodiment except the lock seal head is replaced with a barrel lock. Also shown is a change in the blow-out-proof stem. With the addition of other distinctions, this additional embodiment nevertheless operates in similar fashion to the prior embodiment. The barrel lock is configured to secure to the blow-out-proof stem to hold the T-head in either a valve open position, valve closed position, or actuating range slot. The barrel lock needs to be removed like the lock seal head of the prior embodiment before the T-head can be repositioned.

Figure 13:
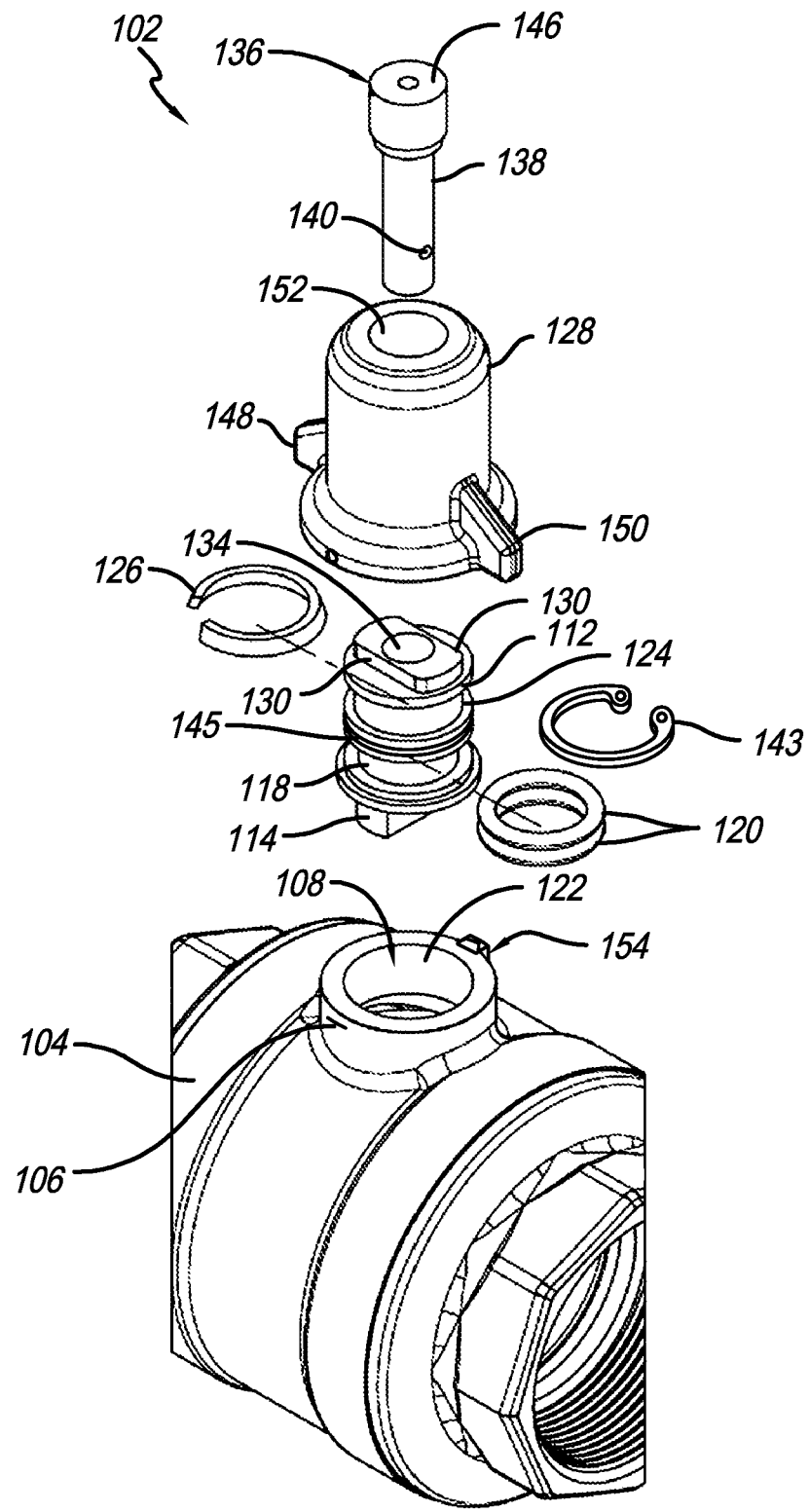
FIG. 13 is an exploded perspective view of another illustrative embodiment of a security blow-out-proof valve assembly.

An exploded perspective view of security blow-out-proof valve assembly 102 is shown in FIG. 13. It is notable that this design may be more suitable for larger valve assemblies that are not conducive for use with lock seal heads, for example. Security blow-out-proof valve assembly 102 includes valve body 104 with neck 106 having a bore 108 disposed there through to provide access to ball 110 (see, also, FIG. 14). Blow-out-proof stem 112 is shown having its keying plug 114 configured to engage keyed slot 116 in ball 110 to pivot same between open and closed positions. A recessed section 118 is configured to receive illustrative double O-ring 120 that provides the seal between blow-out-proof stem 112 and interior of valve body 104 at interior surface 122 of neck 106. A groove 145 is shown in blow-out-proof stem 112 for receiving retaining ring 143 to help movably secure blow-out-proof stem 112 with neck 106. A second recessed section 124 is likewise configured to receive lock ring 126 that movably holds T-head 128 onto blow-out-proof stem 112. An engagement edge 130 provides another keyed structure configured to engage an interior engagement edge 132 (see FIGS. 14 and 15) in T-head 128 which causes same to be able to rotate blow-out-proof stem 112 and thus ball 110 (see, also, FIG. 15). A bore 134 is disposed in blow-out-proof stem 112 to receive post portion 138 of barrel lock 136. A detent 140 extends from post portion 138 that is engageable in a slot ring 144 located in the interior of blow-out-proof stem 112 (see also FIGS. 14 and 15). A tool receiving opening 146 is located on barrel lock 136, and is configured to receive a tool that would allow barrel lock 136 to be removed from blow-out-proof stem 112. With further respect to T-head 128, it is shown having flanges 148 and 150 that extend outward from T-head 128. Bore 152 is disposed through T-head 128 and configured to receive both blow-out-proof stem 112 and barrel lock 136. Lastly, a detent 154 extends from neck 106 in similar manner as detent 68 extended from neck 36 of the prior embodiment.

As the skilled artisan will appreciate, operation of T-head 128, vis-à-vis detent 154 on neck 106, is similar to that of T-head 22 and detent 68 of neck 36 of the prior embodiment. That said, how T-head 128 is locked in place or removed for adjustment is different.

Figure 14:
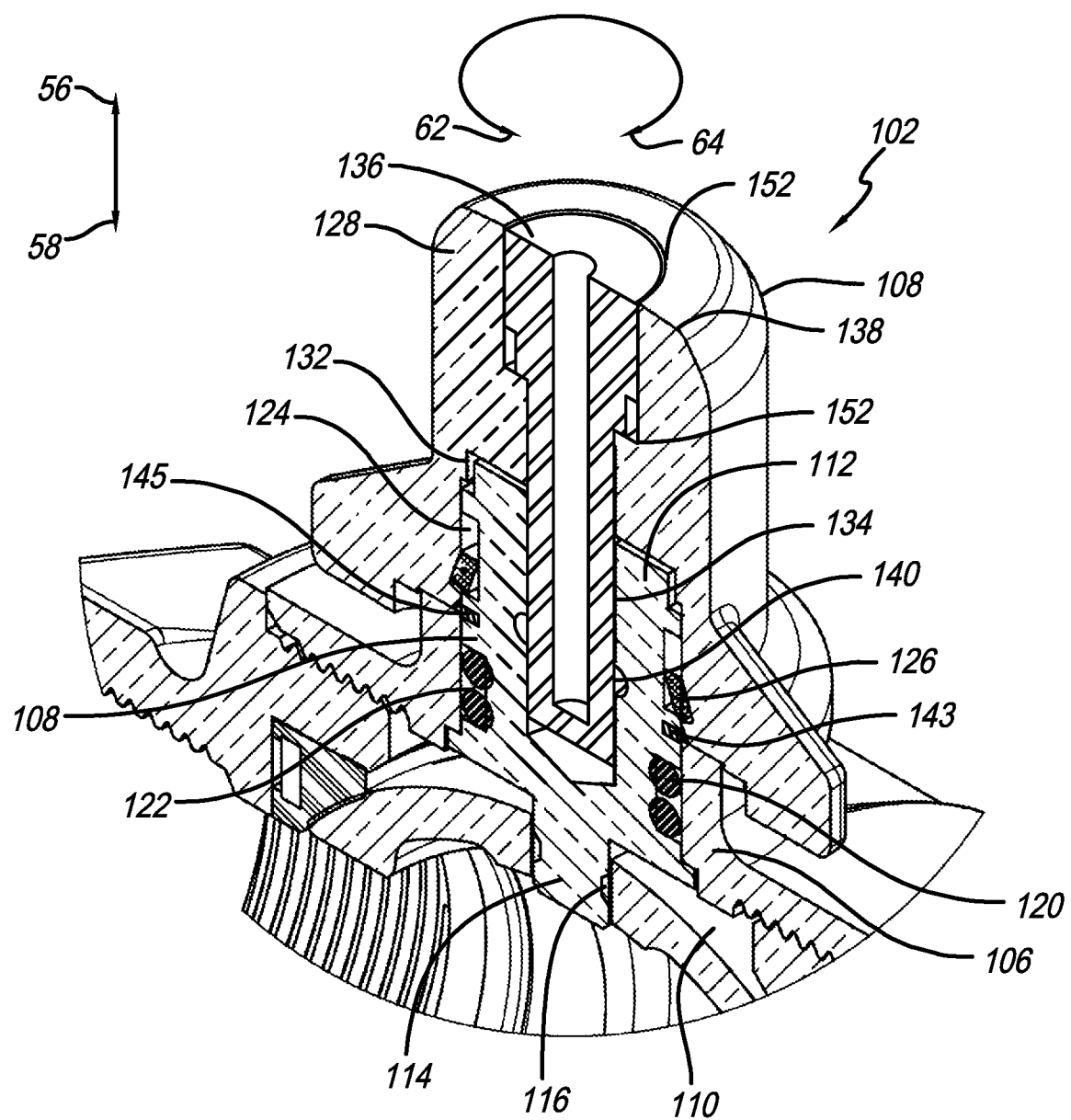
FIG. 14 is a perspective cross-sectional view of the security blow-out-proof valve assembly if FIG. 13.

A perspective cross-sectional view of security blow-out-proof valve assembly 102 is shown in FIG. 14. Here, blow-out-proof stem 112 is inserted into neck 106 of valve body 104 with double O-ring 120 creating a seal between blow-out-proof stem 112 and interior surface 122 that forms opening 108 of neck 106. This is similar to the prior embodiment. Also similar to the prior embodiment is how locking ring 126 fits into both second recessed section 124 of blow-out-proof stem 112 and cavity 82 of T-head 128. In contrast, however, barrel lock 136 is disposed through both bore 152 of T-head 128 and bore 134 of blow-out-proof stem 112. Groove 145 is shown in blow-out-proof stem 112 receiving retaining ring 143. Detents 140 and 142 are shown engaging slot ring 144 of blow-out-proof stem 112 as well. In this case, barrel lock 136 cannot be removed without a special tool. Illustratively, such a tool may be a barrel lock key which is inserted into key hole 146 of barrel lock 136. This activates a locking mechanism which releases detents 140 and 142 from retaining slot ring 144 allowing the barrel lock 136 to be removed from bore 152 and 134. Once barrel lock 136 is removed, T-head 128 may now be lifted in direction 56 above detent 154, allowing T-head 128 to rotate in the direction of 62 and 64 to a desired position. Once in position, T-head 128 can be lowered in direction 58 to reengage detent 154. The user may then replace barrel lock 136 into bores 152 and 134, and remove barrel lock key to reengage detents 140 and 142 with retaining slot ring 144. This locks T-head 128 into its fixed open, fixed close, or actuating position. Without removing barrel lock 136, T-head 128 cannot be raised in direction 56 to re-position and adjust ball 110. Accordingly, ball 110 is locked in the position it is at and cannot be moved.

Figure 15:
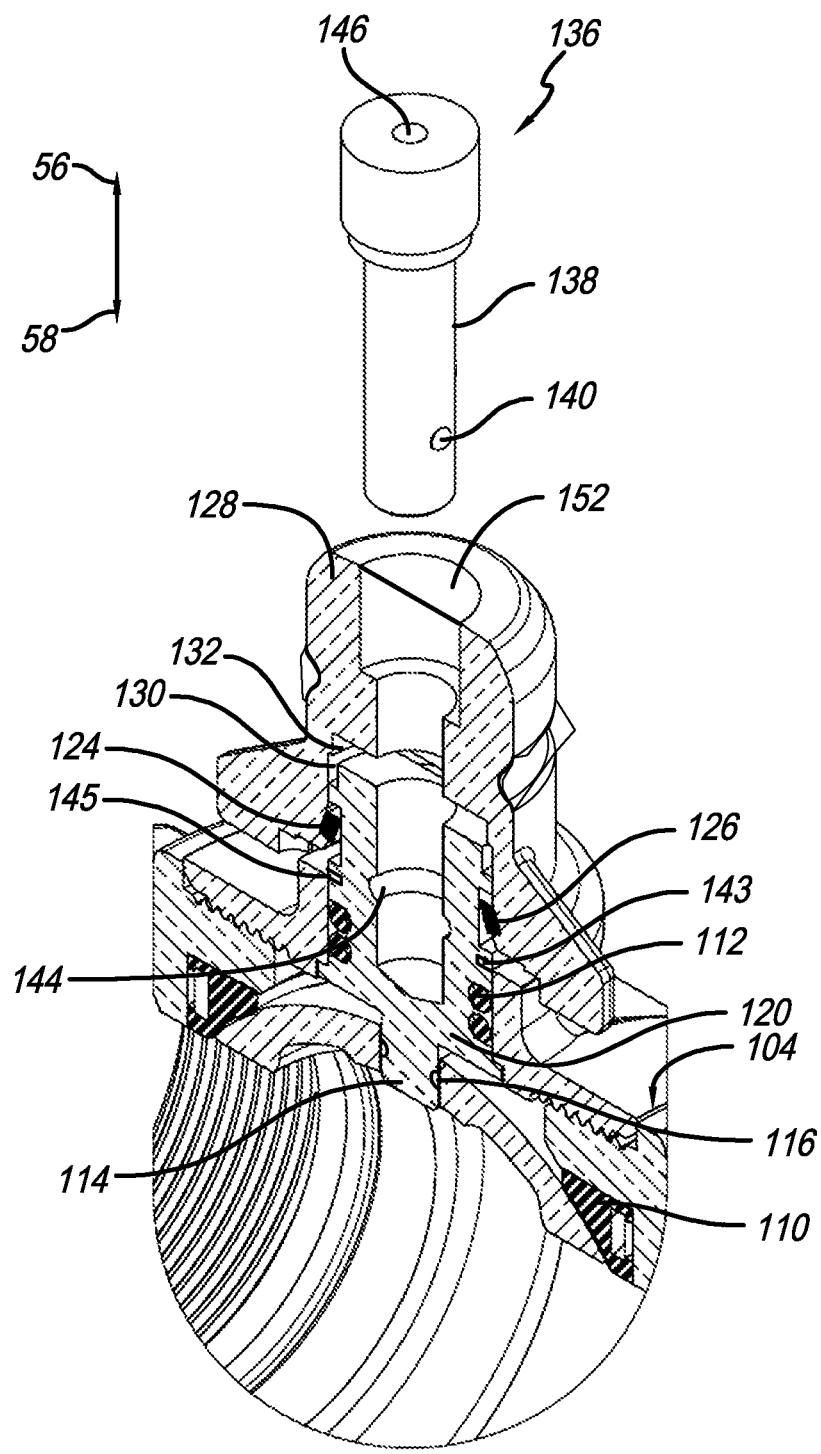
FIG. 15 is another perspective view of the security blow-out-proof valve assembly of FIG. 13 showing the blow-out-proof valve stem in an exploded view.

A perspective view of security blow-out-proof valve assembly 102 is shown in FIG. 15. This view is similar to that shown in FIG. 14, except in this case, barrel lock 136 has been removed from bores 152 and 134. Accordingly, T-head 128 is shown lifted in direction 56 as allowed by locking ring 126 in second recess section 124. T-head 128 includes locked open notch 156, lock closed notch 158, and actuating range slot 160 shown in FIG. 17 similar to notches 86 and 88 and slot 90 of the prior embodiment. T-head 128 is adjustable and operates blow-out-proof stem 112 in the same way that T-head 22 rotated blow-out-proof stem 30 in the prior embodiment to rotate ball 70.

Figure 16:
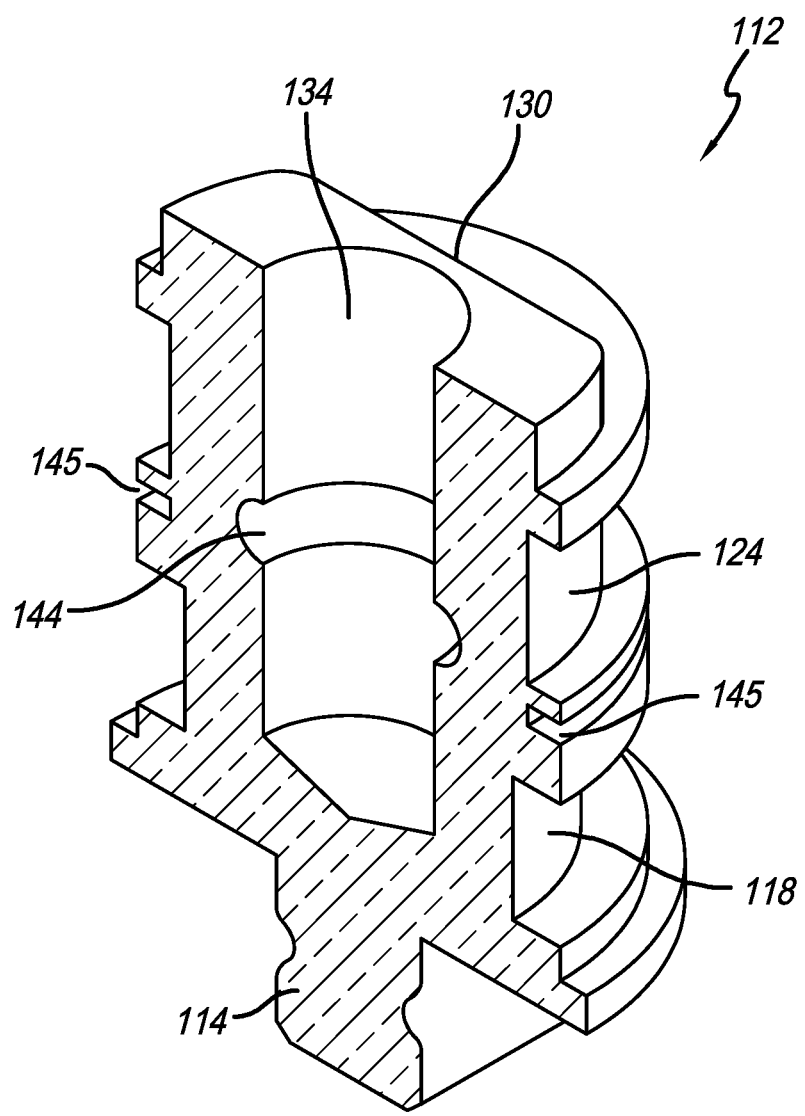
FIG. 16 is a perspective cross-sectional view of the blow-out-proof stem of the security blow-out-proof valve assembly of FIG. 13.

A perspective cross-sectional view of blow-out-proof stem 112 is shown in FIG. 16. As discussed with respect to FIG. 13, blow-out-proof stem 112 includes keying plug 114, recessed section 118, and second recessed section 124. Engagement edge 130 is shown spaced apart from second recessed section 124. Bore 134 is also shown disposed in blow-out-proof stem 112 to receive post portion 138 of barrel lock 136. In addition, groove 145 is shown in blow-out-proof stem 112 configured to receive retaining ring 143.

Figure 17:
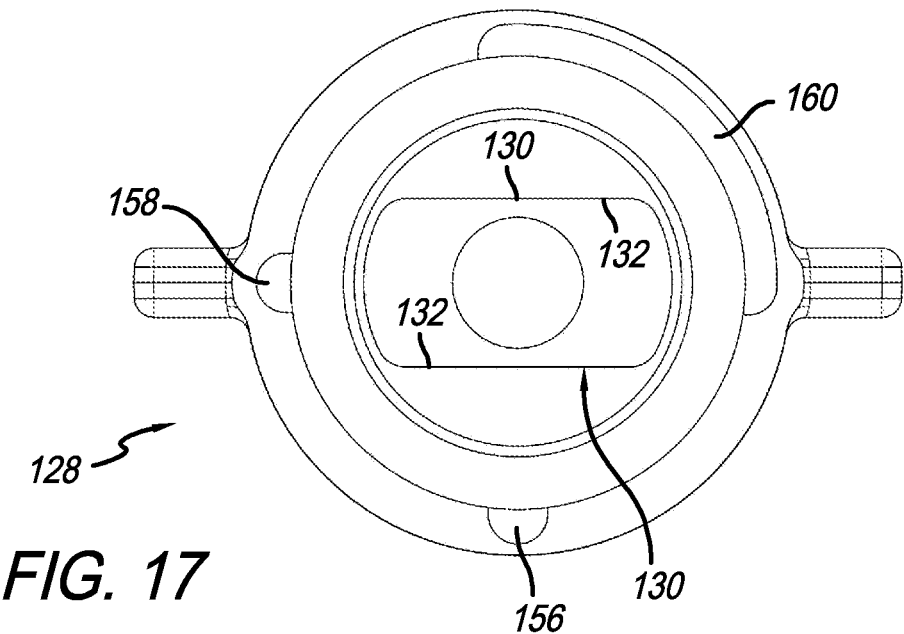
FIG. 17 is an underside view of the T-head portion of the security blow-out-proof valve assembly of FIG. 13.
Figure 18:
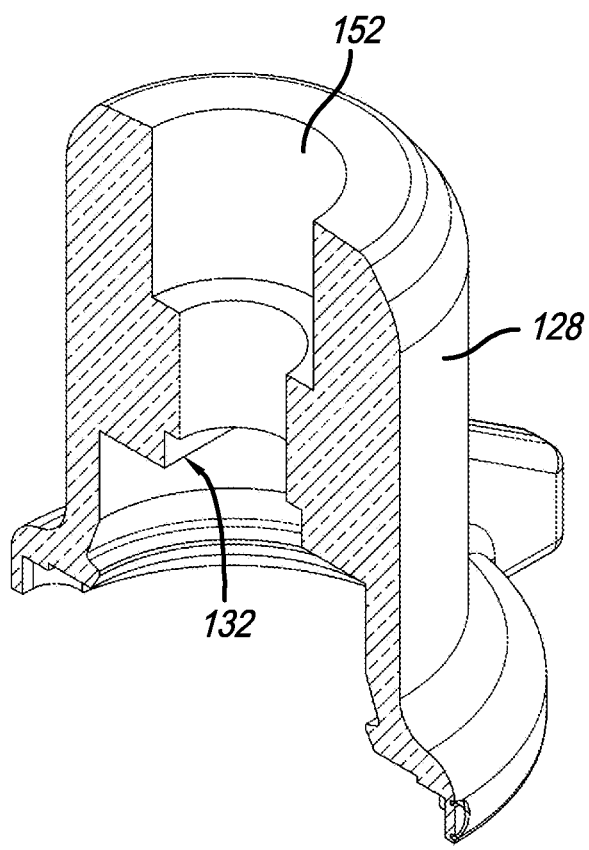
FIG. 18 is a perspective cross-sectional view of the T-head of FIG. 17.

An underside and perspective cross-sectional view of T-head 128 is shown in FIGS. 17 and 18, respectively. With respect to FIG. 17, lock open notch 156, lock closed notch 158, and actuating range slot 160 are shown. They engage detent 154 (see FIG. 13) in the same way as described with respect to detent 68 of the prior embodiment. Also shown is interior engagement edge 132 configured to engage engagement edge 130 of blow-out-proof stem 112. This allows T-head 128 to pivot blow-out-proof stem 112 in the same manner as T-head 22 pivoted blow-out-proof stem 30 of the prior embodiment. These structures are also evident in the cross-section perspective view of FIG. 18.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional Patent Application that may differ from the priority application, the disclosure from this non-provisional Patent Application controls.

What is claimed is:

1. A valve assembly comprising:
   a valve member having a passage disposed there through;
   a valve body that contains the valve member;
   wherein the valve body has a first side and a second side;
   wherein the valve member located in the valve body is selectively movable relative to the valve body;
   wherein movement of the valve member to a first location positions the passage of the valve member in fluid communication with both the first side and the second side of the valve body;
   wherein movement of the valve member to a second location positions the passage of the valve member so the passage is not in fluid communication with both the first side and the second side of the valve body;
   a valve stem that engages the valve member and is movable therewith;
   wherein the valve stem includes an at least one surface;
   a head located on the valve stem and is selectively movable therewith;
   wherein the head is movable relative to the valve stem such that the head is selectively engagable with the at least one surface of the valve stem;
   wherein when the head is engaged with the at least one surface of the valve stem movement of the head moves the valve stem such that the valve stem moves the valve member between the first and second locations within the valve body;
   wherein when the head is not engaged with the at least one surface of the valve stem, movement of the head is relative to the valve stem and the valve stem does not move the valve member;
   a lock that selectively engages the valve stem;
   wherein when the lock is engaged to the valve stem the lock limits movement of the head to the extent that the head cannot engage the at least one surface on the valve stem which prevents the head from moving the valve stem to move the valve member;
   wherein when the lock is not engaged to the valve stem the lock does not limit movement of the head such that the head is selectively engageable with the at least one surface on the valve stem such that movement of the head moves the valve stem such that the valve stem moves the valve member; and
   a detent located adjacent the head;
   wherein the head includes a first cavity, a second cavity, and a third cavity such that the detent is sized to be selectively received in the first cavity, the second cavity, and the third cavity;
   wherein when the detent is located in the first cavity, the head is held such that the valve member is positioned at the first location within the valve body;
   wherein when the detent is located in the second cavity, the head is held such that the valve member is positioned at the second location within the valve body; and
   wherein when the detent is located in the third cavity, the head is movable such that the valve member is movable between the first and second locations within the valve body.

2. The valve assembly of claim 1, wherein the valve member is a ball valve.

3. The valve assembly of claim 1, wherein the head is a T-shaped head.

4. The valve assembly of claim 1, wherein the head is movable linearly relative to the valve stem such that the head is selectively engagable with the at least one surface of the valve stem, and wherein when the head is engaged with the at least one surface of the valve stem movement of the head and the valve stem is rotational to move the valve member between first and second locations within the valve body.

5. The valve assembly of claim 1, wherein the head is moved linearly to disengage the head from the detent.

6. The valve assembly of claim 1, wherein the head is retained on the valve stem when movable relative to the valve stem.

7. The valve assembly of claim 1, wherein the valve stem includes a recess that receives a locking ring that engages both the valve stem and the head, wherein the locking ring and the recess in the valve stem limits the movement of the head relative to the valve stem.

8. The valve assembly of claim 1, wherein the valve stem includes a flange that retains a portion of the valve stem on the valve body.

9. A valve assembly comprising:
   a valve member having a passage disposed there through;
   a valve body that contains the valve member;
   wherein the valve body has a first side and a second side;
   wherein the valve member located in the valve body is selectively movable relative to the valve body;
   wherein movement of the valve member to a first location positions the passage of the valve member in fluid communication with both the first side and the second side of the valve body;
   wherein movement of the valve member to a second location positions the passage of the valve member so the passage is not in fluid communication with both the first side and the second side of the valve body;
   a valve stem that engages the valve member and is movable therewith;
   wherein the valve stem includes an at least one surface; and
   a head located on the valve stem and is selectively movable therewith;
   wherein the head is movable relative to the valve stem such that the head is selectively engagable with the at least one surface of the valve stem;
   wherein when the head is engaged with the at least one surface of the valve stem movement of the head moves the valve stem such that the valve stem moves the valve member between the first and second locations within the valve body:
   a detent located adjacent the head;
   wherein the head includes a first cavity, a second cavity, and a third cavity such that the detent is sized to be selectively received in the first cavity, the second cavity, and the third cavity;

wherein when the detent is located in the first cavity, the head is held such that the valve member is positioned at the first location within the valve body;

wherein when the detent is located in the second cavity, the head is held such that the valve member is positioned at the second location within the valve body; and wherein when the detent is located in the third cavity, the head is movable such that the valve member is movable between the first and second locations within the valve body.

10. The valve assembly of claim 9, wherein when the head is not engaged with the at least one surface of the valve stem, movement of the head is relative to the valve stem and the valve stem does not move the valve member.

11. The valve assembly of claim 9, further comprising a lock that selectively engages the valve stem.

12. The valve assembly of claim 11, wherein when the lock is engaged to the valve stem the lock limits movement of the head to the extent that the head cannot engage the at least one surface on the valve stem which prevents the head from moving the valve stem to move the valve member, and wherein when the lock is not engaged to the valve stem the lock does not limit movement of the head such that the head is selectively engageable with the at least one surface on the valve stem such that movement of the head moves the valve stem such that the valve stem moves the valve member.

13. A valve assembly comprising:
a valve body that contains a valve member movable between open and closed positions within the valve body;
a valve stem extending from the valve body;
wherein the valve stem moves the valve member between open and closed positions within the valve body;
a head located on the valve stem and is selectively movable relative to the valve stem and selectively moves the valve stem;
wherein when the head selectively moves the valve stem the head moves the valve member between open and closed positions; and
a lock that selectively limits movement of the head;
wherein the lock is engageable with the valve stem to selectively limit the movement of the head; and
a detent located adjacent the head wherein the head includes a first cavity, a second cavity, and a third cavity such that the detent is sized to be selectively received in the first cavity, the second cavity, and the third cavity.

14. The valve assembly of claim 13, wherein the valve stem includes an at least one surface such that the head is selectively engageable with the at least one surface of the valve stem to move the valve member between open and closed positions.

15. The valve assembly of claim 13, wherein the head is a T-shaped head.

* * * * *